(12) United States Patent
Lu et al.

(10) Patent No.: US 8,411,290 B2
(45) Date of Patent: Apr. 2, 2013

(54) USER INTERFACE APPARATUS, IMAGE PROCESSING APPARATUS, AND COMPUTER PROGRAM PRODUCT

(75) Inventors: Bin Lu, Tokyo (JP); Tetsuya Sakayori, Tokyo (JP); Iwao Saeki, Kanagawa (JP); Junichi Takami, Kanagawa (JP); Toshio Miyazawa, Kanagawa (JP); Yoshifumi Sakuramata, Tokyo (JP); Yoshinaga Kato, Kanagawa (JP); Yu Sekiguchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1747 days.

(21) Appl. No.: 11/520,646

(22) Filed: Sep. 14, 2006

(65) Prior Publication Data
US 2007/0058226 A1 Mar. 15, 2007

(30) Foreign Application Priority Data

Sep. 14, 2005 (JP) .................................. 2005-267654
Jul. 18, 2006 (JP) .................................. 2006-196205

(51) Int. Cl.
*G03F 3/10* (2006.01)

(52) U.S. Cl. .......................... 358/1.13; 358/527; 358/1.1

(58) Field of Classification Search .................. 358/527, 358/1.13, 1.1, 1.15
See application file for complete search history.

(56) References Cited

U.S. PATENT DOCUMENTS 6,701,011 B1 * 3/2004 Nakajima ...................... 382/167
2003/0086720 A1 * 5/2003 Song ................................ 399/81
2005/0246604 A1 11/2005 Fujimoto et al.

FOREIGN PATENT DOCUMENTS

| JP | 8-279884 | 10/1996 |
| JP | 10-294821 | 11/1998 |
| JP | 11-234503 | 8/1999 |
| JP | 2001-285534 | 10/2001 |
| JP | 2002-103726 | 4/2002 |
| JP | 2003-5471 | 1/2003 |
| JP | 2003005471 | * 1/2003 |

OTHER PUBLICATIONS

JP2003005471 english translation.*

* cited by examiner

*Primary Examiner* — King Poon
*Assistant Examiner* — Iriana Cruz
(74) *Attorney, Agent, or Firm* — Oblon, Spivak, McClelland, Maier & Neustadt, L.L.P.

(57) ABSTRACT

In a user interface apparatus, when a selected position of a to-be-processed image displayed on a display screen is detected through an area detecting unit, a menu display unit displays, in response to the detection of the selected position on the to-be-processed image, a link to at least one setting item being displayed in response to the selected position, the at least one setting item corresponding to a setting available for a setting area which corresponds to the selected position, where an order of display priority of the at least one setting item is determined by a size of the setting area. A determining unit determines that the setting item is specified, and an accepting unit accepts the setting corresponding to the setting item for the to-be-processed image. A preview display unit displays a preview indicating a result of processing the to-be-processed image based on the setting item.

16 Claims, 19 Drawing Sheets

FIG. 3

| SETTING AREA NAME | POSITION (UPPER-LEFT, LOWER-RIGHT COORDINATES) | CORRESPONDING FUNCTIONS |
|---|---|---|
| UPPER-LEFT STAPLE SETTING CHANGE | (0,0), (40,40) | STAPLE CANCEL STAPLE CHANGE |
| UPPER-LEFT STAMP PRINTING SETTING CHANGE | (15,0), (15,30) | STAMP PRINTING CANCEL STAMP PRINTING CHANGE |

FIG. 7

| SETTING AREA NAME | POSITION (UPPER-LEFT, LOWER-RIGHT COORDINATES) | CORRESPONDING FUNCTION | PRIORITY |
|---|---|---|---|
| LEFT STAPLE SETTING | (0,175), (40,215) (0,400), (40,440) | LEFT STAPLE SETTING | 1 |
| LEFT MARGIN SETTING | (0,0), (45,700) | LEFT MARGIN SETTING | 2 |

FIG. 10

| SETTING AREA NAME | POSITION (UPPER-LEFT, LOWER-RIGHT COORDINATES) | CORRESPONDING FUNCTIONS |
|---|---|---|
| LEFT PUNCH SETTING CHANGE | (10,175), (35,215) (10,400), (35,440) | LEFT PUNCH CANCEL |
| LEFT MARGIN SETTING | (0,0), (45,700) | LEFT MARGIN SETTING |

USER INTERFACE APPARATUS, IMAGE PROCESSING APPARATUS, AND COMPUTER PROGRAM PRODUCT

CROSS-REFERENCE TO RELATED APPLICATIONS

The present document incorporates by reference the entire contents of Japanese priority documents, 2005-267654 filed in Japan on Sep. 14, 2005 and 2006-196205 filed in Japan on Jul. 18, 2006.

BACKGROUND OF THE INVENTION

1. Field of the Invention

The present invention relates to a user interface apparatus, an image processing apparatus, and a computer program product 2. Description of the Related Art In an image processing apparatus such as a copier, a facsimile machine, a printer, or a multifunction product (MFP) having these functions, a user needs to select a desired function from functions of the image processing apparatus, and determine parameters or settings for the function. Examples of the settings include a setting related to document state such as document type, color density and margin size, a setting related to various image processing such as magnification/reduction of image and single-side/double-side printing, and a setting related to post-processing such as sorting, stapling, and hole punching.

Such a conventional image processing apparatus offers a large number of setting items and various setting contents with respect to each setting item to allow a user to use a wide variety of functions. However, a user has to specify settings to achieve a desired result by selecting a setting item from numbers of the setting items, which is inconvenient for the user.

Japanese Patent Application Laid-open No. H8-279884 discloses an image processing apparatus to improve operability for a user. In the conventional image processing apparatus, an image of an original placed on a contact glass is pre-scanned at the time a cover is closed. Based on the pre-scanned image, image processing for the original image is automatically selected by distinguishing a color image and a black and white image, and a text part and a photograph part.

Japanese Patent Application Laid-open No. 2001-285534 discloses another image processing apparatus that facilitates setting of document reading conditions. In the conventional image processing apparatus, when a user arbitrarily sets document reading conditions, contents of the conditions are stored as one group correspondingly to a reading condition button displayed on the image processing apparatus. Previously registered contents are called by designating the reading condition button, and a plurality of setting items are automatically updated to registered values.

These conventional technologies reduce setting items by narrowing down the setting items based on pre-scan image data, or facilitate setting of document reading conditions by operating the reading condition button.

Besides, Japanese Patent Application Laid-open No. 2003-5471 discloses a preview display apparatus that displays a preview image indicating a printing result. Japanese Patent Application Laid-open No. 2002-103726 discloses an image processing apparatus that displays a preview image generated based on the state of a sheet selected from those having different qualities. Japanese Patent Application Laid-open No. H11-234503 discloses an image forming system that displays a preview by combining a plurality of edited image data.

According to these conventional technologies, a preview is displayed as a result of processing an image or a plurality of images based on setting contents. Intended image output can be obtained by respecifying settings while viewing the preview and checking the finished state before printing.

With the conventional technologies described in Japanese Patent Application Laid-open No. H8-279884 and Japanese Patent Application Laid-open No. 2001-285534, setting items can be reduced, and settings of the document reading conditions can be simplified. However, setting items with respect to each section of an image to be processed is not appropriately and clearly presented enough.

With the conventional technologies such as that disclosed in Japanese Patent Application Laid-open No. 2003-5471, a preview is displayed as a result of processing an image or a plurality of images based on setting contents. Operation for setting processing contents of an image to be processed cannot be improved, and setting items with respect to each section of the image is not appropriately and clearly presented enough.

SUMMARY OF THE INVENTION

It is an object of the present invention to at least partially solve the problems in the conventional technology.

According to an aspect of the present invention, a user interface apparatus includes an area detecting unit that detects a selected position on a to-be-processed image displayed on a display screen, a menu display unit that displays on the display screen, in response to the detection of the selected position on the to-be-processed image, a link to at least one setting item being displaying in response to the selected position on the to-be-processed image, the at least one setting item corresponding to a setting available for a setting area which corresponds to the selected position on the to-be-processed image, wherein an order of display priority of the at least one setting item is determined by a size of the setting area, a determining unit that determines that the setting item is specified, an accepting unit that accepts the setting corresponding to the setting item for the to-be-processed image, and a preview display unit that displays on the display screen a preview indicating a result of processing the to-be-processed image based on the setting item.

According to another aspect of the present invention, an image processing apparatus includes a storing unit that previously stores in a storage unit at least one setting area for a display area of a display screen in association with at least one setting item for a to-be-processed image displayed on the display screen, an area detecting unit that detects a selected position on the to-be-processed image, a menu display unit that displays on the display screen, in response to the detection of the selected position on the to-be-processed image, the setting item in the storage unit, a link to the setting item being displayed in response to the selected position on the to-be-processed image, the at least one setting item corresponding to a setting available for the setting area which corresponds to the selected position on the to-be-processed image, wherein an order of display priority of the setting item is determined by a size of the setting area, a determining unit that determines that the setting item is specified, an accepting unit that accepts the setting corresponding to the setting item for the to-be-processed image, a preview generating unit that generates a preview indicating a result of processing the to-be-processed image based on the setting item, and a preview display unit that displays the preview on the display screen.

According to still another aspect of the present invention, a non-transitory computer-readable storage medium includes computer executable instructions, wherein the instructions, when executed by a computer, cause the computer to perform the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic of one example of contents of a setting area table;
FIG. 7 is a schematic of one example of contents of the setting area table;
FIG. 10 is a schematic of one example of contents of the setting area table.

DETAILED DESCRIPTION OF THE PREFERRED EMBODIMENTS

Exemplary embodiments of the present invention will be explained below in detail referring to the accompanying drawings. However, the present invention is not limited to the embodiments unless otherwise stated.

In the embodiments described below, an MFP is applied as an example to a user interface apparatus and an image processing apparatus. The MFP has combined functions of copying, faxing, printing, scanning, and a function of distributing an input image (an original image read by a scanner or an image input to a printer or a facsimile machine).

Figure 1:
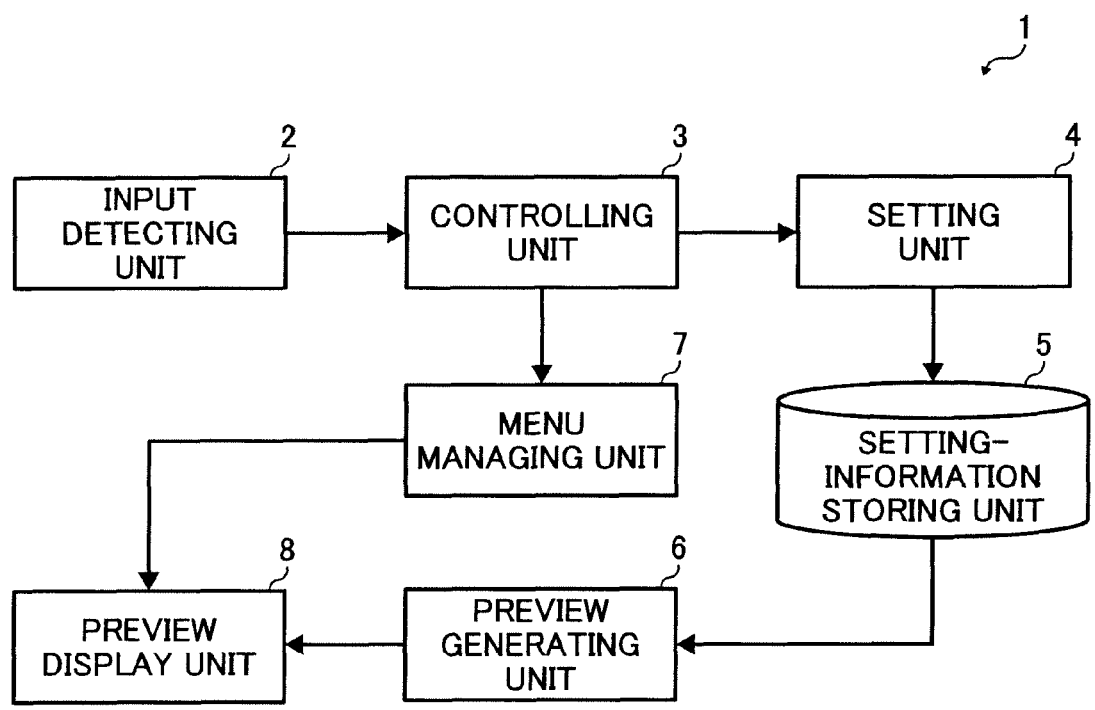
FIG. 1 is a block diagram of an image processing apparatus according to a first embodiment of the present invention.

FIG. 1 is a block diagram of a main part, especially a user interface part (user interface unit), of an image processing apparatus 1 according to the first embodiment of the present invention.

The image processing apparatus 1 includes an input detecting unit 2, a controlling unit 3, a setting unit 4, a setting-information storing unit 5, a preview generating unit 6, a menu managing unit 7, and a preview display unit 8. The image processing-apparatus 1 further includes image input units such as a scanner and a communicating unit that receives images to be processed, and an image memory that stores image data (not shown). The image processing apparatus 1 can be applied to an MFP, a copier, a facsimile machine, a printer, a computer, etc.

The input detecting unit (area specifying unit) 2 employs various operation keys, a touch panel arranged in the preview display unit (for example, a liquid crystal display (LCD)) 8, etc., and various operations necessary to operate the image processing apparatus 1 are performed with the operation keys and the touch panel. Specifically, settings for processing an image (to-be-processed image) that the user wishes to print, print conditions, a post-processing are specified.

For example, to allow the user to specify various settings for printing by the input detecting unit 2, setting items (menu items) are displayed on the preview display unit 8, so that user can select one or more desired items, together with parameters (setting contents) for each setting item. The setting items include, for example, various setting items with respect to reading conditions at a document reading unit (not shown) corresponding to document status, various setting items with respect to image processing contents (for example, sharpness and color adjustment) at an image processing unit (not shown) that processes read image data, various setting items with respect to print conditions at a printing unit (not shown), and various setting items with respect to post-processing such as sorting, stapling, and punching holes to printed materials at a post-processing unit (not shown).

Figure 2:
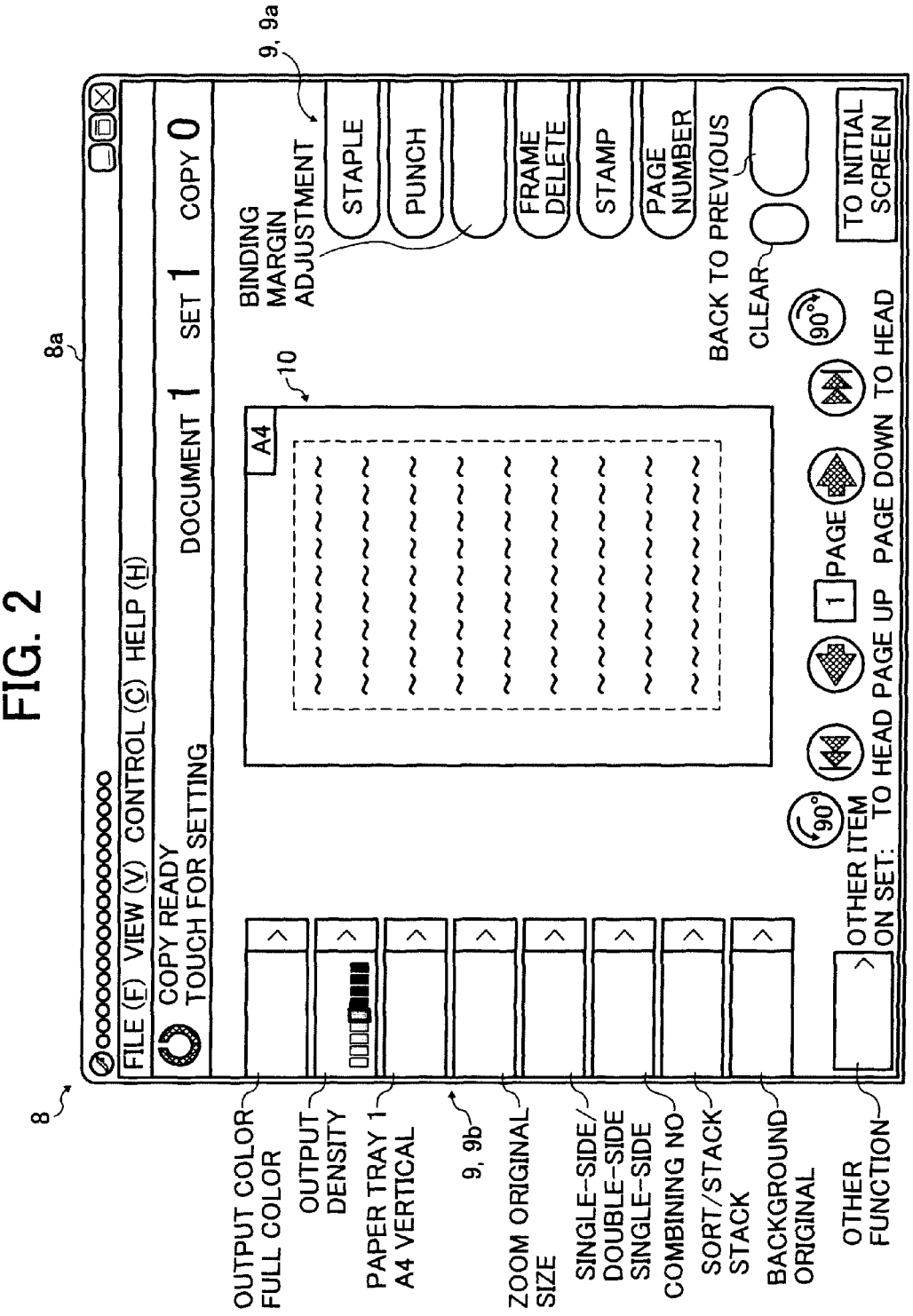
FIG. 2 is one example of a display on a display screen of a preview display unit shown in FIG. 1.

FIG. 2 is one example of a display on a display screen 8a of the preview display unit 8. The display screen 8a of the preview display unit 8 displays an image to be processed (preview) 10 and setting items (menu items) 9. For the setting items 9, a menu 9a dependent of positions on the image to be processed is displayed on the right side of the screen. The menu 9a includes staple, punch, binding margin adjustment, frame delete, stamp, page number, etc. A menu 9b independent of the contents is displayed on the left side of the screen. The menu 9b includes output color, output density, paper, zoom up/down, single-side/double-side, combining, sort/stack, background, etc.

The controlling unit 3 includes a Central Processing Unit (CPU), a Read Only Memory (ROM), a Random Access Memory (RAM), etc. The controlling unit 3 utilizes the RAM as a working memory based on programs in the ROM while controlling the units of the image processing apparatus 1 and conducting various basic function processes of the image processing apparatus 1 such as a copy function process, a printer function process, a scanner function process, as well as various setting processes on images to be processed described below. The controlling unit 3 accepts various setting operations from the input detecting unit 2 and distributes the various processes to the setting unit 4 and to the menu management unit 7 based on input setting contents. When various functions that the image processing apparatus provide are conducted at the input detecting unit 2, for example when the copy function process described above is selected and operated, the controlling unit 3 transmits a process request to the setting unit 4. When a position of a preview is specified (by touch operation) through the touch panel of the input detecting unit 2 (position detecting unit), the controlling unit 3, as described below, transmits a process request to the menu managing unit 7, and performs a setting process on an image, etc., to enable a user to make settings. In the setting process, setting items are displayed, which are preset as being available in a setting area, described later, corresponding to the specified position.

After receiving setting contents of the setting items input from the input detecting unit 2 through the controlling unit 3, the setting unit 4, based on the setting contents, performs image processing, printing, and post-processing for images to be processed that are received from the image input unit and stored as needed in the image memory. In setting processing in image mode, the setting unit 4 does not actually perform the processes based on the setting contents, and outputs various setting information necessary to perform the processes to the setting-information storing unit 5.

The setting-information storing unit 5 stores the various setting information from the setting unit 4 in a hard disk drive (HDD), etc., and default information at the initial state. Examples of the setting information include size of paper, the number of documents (the number of pages), document type, document side (distinction of double-side document/single-side document), image type (text, photograph, illustration, mixed image of these), color use (monochrome/color, the number of colors), document density, pixel density (area ratio of pixel part in the whole document), font-size used, document direction (positional relationship of up and down, left to right of document), size of document, margin size of up, down, left and right, etc. As for default setting information, for example, paper size: A4, image type: text are preset.

The preview generating unit 6 generates a preview with an image process, a print process, and post-processing conducted to an image to be processed stored in the image memory, etc., based on the setting information stored by the setting-information storing unit 5. The preview generating unit 6 then outputs the generated preview to the preview display unit 8. In the initial state, i.e., while the input detecting unit 2 has not conducted input of setting, the preview generating unit 6 generates a preview based on the default setting information (for example, paper size: A4 and image type: text) stored by the setting information storing unit 5, and outputs the image to the preview display unit 8.

With respect to each setting area and area managing information indicating at least one setting area on the display screen 8a (see FIG. 2) of the preview display unit 8 that displays a preview, the menu managing unit 7 stores in an internal memory (storage unit) setting information containing setting items available for the preview in the setting area and contents of the setting items. When an arbitrary position (coordinates) on the display screen 8a of the preview display unit 8 is touched and specified with the touch panel (area specifying unit) of the input detecting unit 2, the menu managing unit 7 specifies one or predetermined number of the setting areas from the specified position and the area managing information in the internal memory based on predetermined selection criteria. The menu managing unit 7 then determines setting items stored in the internal memory for the identified setting area and directs the preview display unit 8 to display the setting items. When a setting item is selected with the touch panel of the input detecting unit 2 according to the display, the menu managing unit 7 directs the preview display unit 8 to display setting contents stored in the internal memory for the selected setting item.

The menu managing unit 7 stores a setting area table as setting information shown in FIG. 3. In the setting area table of FIG. 3, names of setting areas (for example, upper-left stapling setting change and stamp printing setting change), specified positions indicated by upper-left and lower-right coordinates (for example, (0,0) and (40,40), (15,0) and (15, 30)), and corresponding setting items available (for example, staple cancel, staple change, stamp printing cancel, stamp printing change) are stored. Obviously, setting information are not limited with these.

The preview display unit 8 is, for example, a liquid crystal display panel, and the touch panel of the input detecting unit 2 is arranged on the display screen 8a. As shown in FIG. 2, the preview display unit 8 receives a preview from the preview generating unit 6 and outputs the preview 10 on the display screen 8a. The preview display unit 8 then overlays setting items 9 such as setting items and setting contents from the menu managing unit 7 and the preview 10 on the display screen 8a, and displays the items.

An operation of the embodiment will be described. The image processing apparatus 1 of the embodiment displays on the display screen 8a of the preview display unit 8 the preview 10 of an image after being processed based on setting contents as well as presenting the available setting items 9 according to a position specified on the display screen 8a as shown in FIG. 2. This improves operation of setting various setting items for the preview 10.

Figure 4:
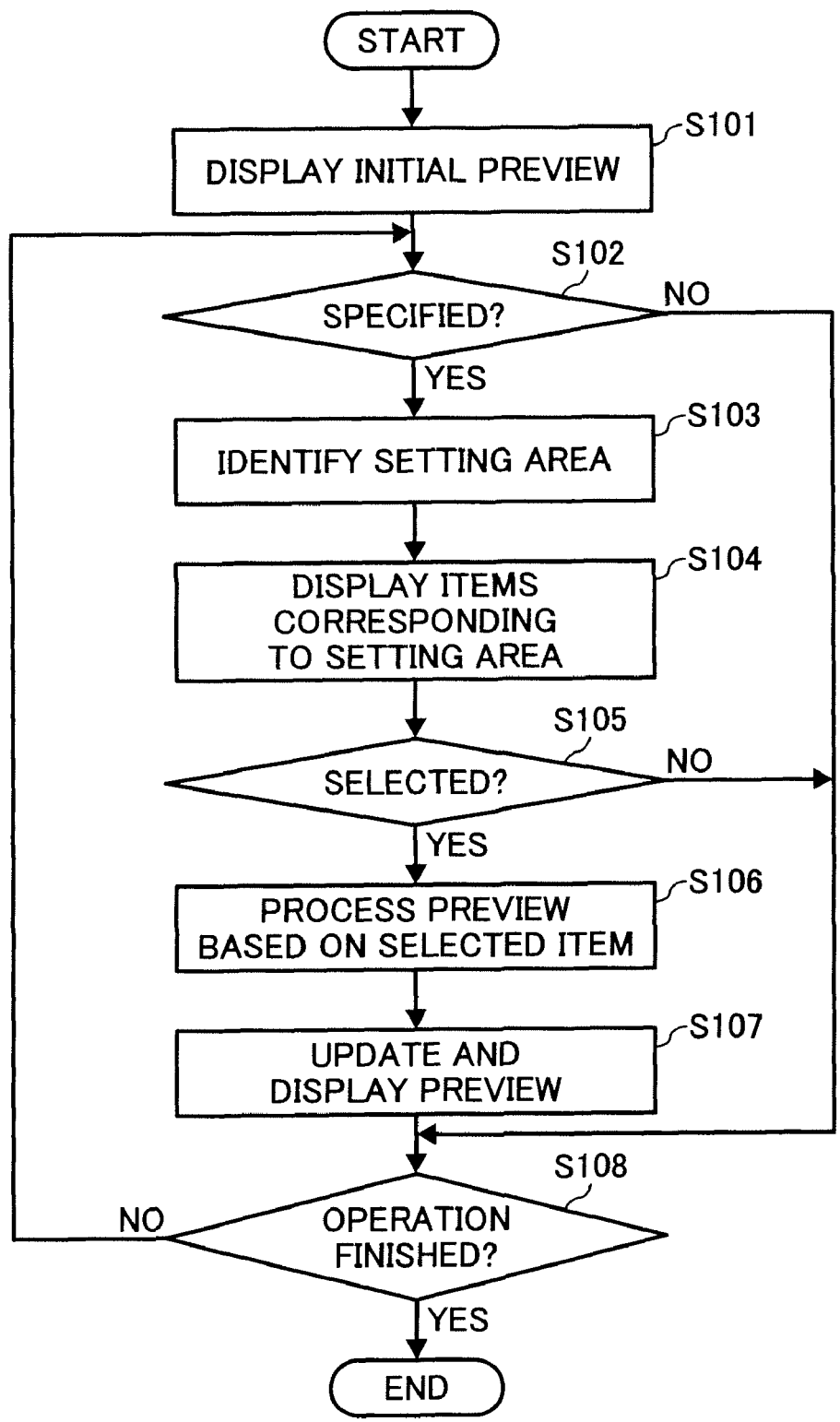
FIG. 4 is a flowchart of a setting process on an image.

A setting process on an image by the image processing apparatus 1 will be described referring to FIG. 4. When the image processing apparatus 1 receives an image to be processed from the image input unit and stores the image in the image memory, the preview generating unit 6 creates the preview 10 of the image based on the default setting (initial setting) information and displays the preview 10 as shown in FIG. 2 on the display screen 8a of the preview display unit 8 (step S101). In FIG. 2, paper size: A4 and image type: text is specified as the default setting information.

After displaying the preview 10, the image processing apparatus 1 checks whether an arbitrary position on the display screen 8a is specified through the touch panel of the input detecting unit 2 (step S102).

When no position is specified (No at step S102), the process proceeds to step S108, and a determination is made as to whether the operation is finished (step S108). When the operation is not finished (No at step S108), the process returns to step S102.

Figure 5:
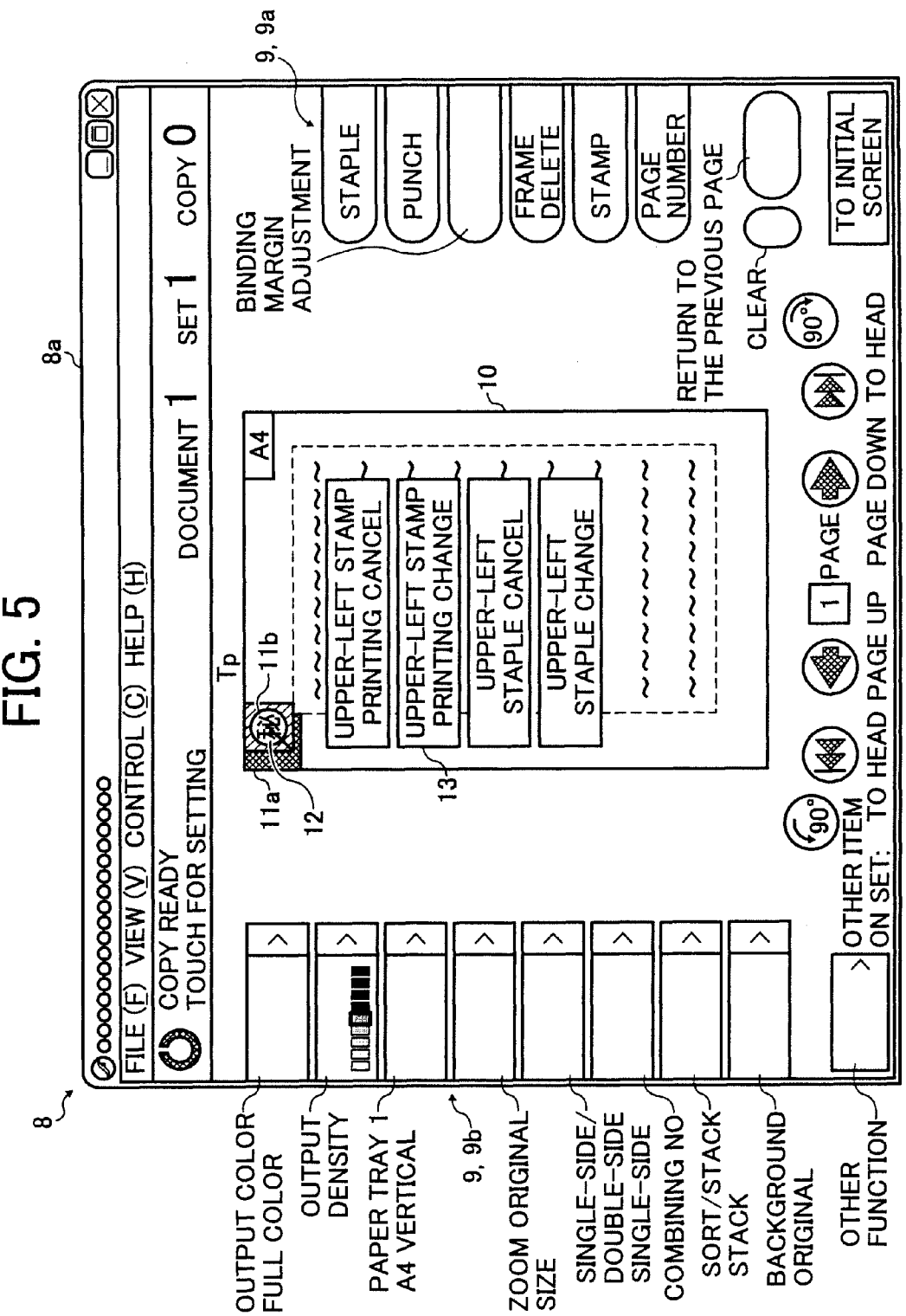
FIG. 5 is one example of a display on the display screen of the preview display unit.

When a position is specified (Yes at step S102), the image processing apparatus 1 identifies a setting area corresponding to the position referring to the setting information in the internal memory (step S103), and displays all setting items associated with the setting area in a predetermined order on the display screen 8a of the preview display unit 8 that displays a preview as shown in FIG. 5 (step S104).

FIG. 5 is one example of the display screen 8a of the preview display unit 8 that displays setting items when the upper left corner of the preview 10 is specified as a touch position Tp in the setting process. As shown in FIG. 5, the upper left corner of the preview 10 corresponds to two setting areas: a setting area 11a for upper-left stapling setting change, and a setting area 11b for upper-left stamp print setting change. In this case, setting items associated with the position on the upper left corner in the setting area table of FIG. 3 are displayed as setting items 13. Specifically, items indicating "upper-left stamp printing cancel", "upper-left stamp printing change", "upper-left stapling cancel", and "upper-left stapling change" are displayed as the setting items 13. Additionally, a staple mark 12 is displayed to indicate that the upper-left stapling is set.

After displaying the setting items 13 on the display screen 8a, the image processing apparatus 1 checks whether one (or more) of the setting items 13 is selected (step S105).

When no item is selected (No at step S105), the process proceeds to step S108 and, as described above, a determination-is made as to whether the operation is finished. When the operation is not finished (No at step S108), the process returns to step S102 and the process from step S102 to S105 is performed.

When a setting item is selected (Yes at step S105), the controlling unit 3 sends the setting contents of the selected setting item 13 to the setting unit 4 (accepting unit). The setting unit 4 generates setting information necessary for process with the setting contents, and outputs the information to the setting-information storing unit 5. The preview generating unit 6 generates a preview based on the setting information from the setting-information storing unit 5 (step S106), and displays the image on the display screen 8a of the preview display unit 8 (step S107).

Subsequent to displaying the preview after setting change, the image processing apparatus 1 checks whether the setting operation is finished (step S108), and when the setting operation is not finished (No at step S108), the process returns to step S102, and the above steps S102 to S108 are performed.

When the setting operation is finished (Yes at step S108), the image processing apparatus 1 ends the setting process on the image.

As described above, in the image processing apparatus 1 of the present embodiment, to process an image according to various setting contents, an arbitrary position is specified on the display screen 8a of the preview display unit 8 that displays a preview corresponding to the setting contents. Then, predetermined numbers of setting items associated with a setting area including the specified position, which are available for the preview, are displayed from among setting items stored in the internal memory of the menu managing unit 7. The internal memory previously stores one or more setting items available for a preview and setting areas in associated manner.

Therefore, appropriate setting items that can be set in each setting area can be presented for a preview. Thus, setting items-can be appropriately selected, and setting operation can be improved.

The image processing apparatus 1 of the embodiment performs a series of various processes including image processing, recording and outputting of the processed image to paper after the image processing, and post-processing of the paper recorded with the processed image. The image processing apparatus 1 stores, in the internal memory of the menu managing unit 7, one or more setting items associated with the setting area, which can be processed in the series of the processes for the preview.

Therefore, a user can make appropriate settings at each of the series of processes from image processing to post-processing while viewing the previews. Thus, the setting operation can be further improved.

If the position specified by the input detecting unit 2 is located-in a plurality of setting areas, the image processing apparatus 1 presents all setting items that can be set to the preview among the setting items stored in the internal memory of the menu managing unit 7 associated with all the setting areas. Therefore, necessary settings can be reliably performed.

Although, in the process described above, when an arbitrary position of the preview is specified and the position is located in a plurality of setting areas, all setting items associated with the setting areas are displayed in a preset order, display of the setting items is not so limited.

For example, when priority is preset in the internal memory-of the menu managing unit 7, a predetermined number of setting areas can be selected based on the priority from the setting areas, and setting items associated with the selected setting areas can be displayed in a predetermined order. Only the top priority setting area can also be selected, and setting items associated with the selected setting area can be displayed.

Figure 6:
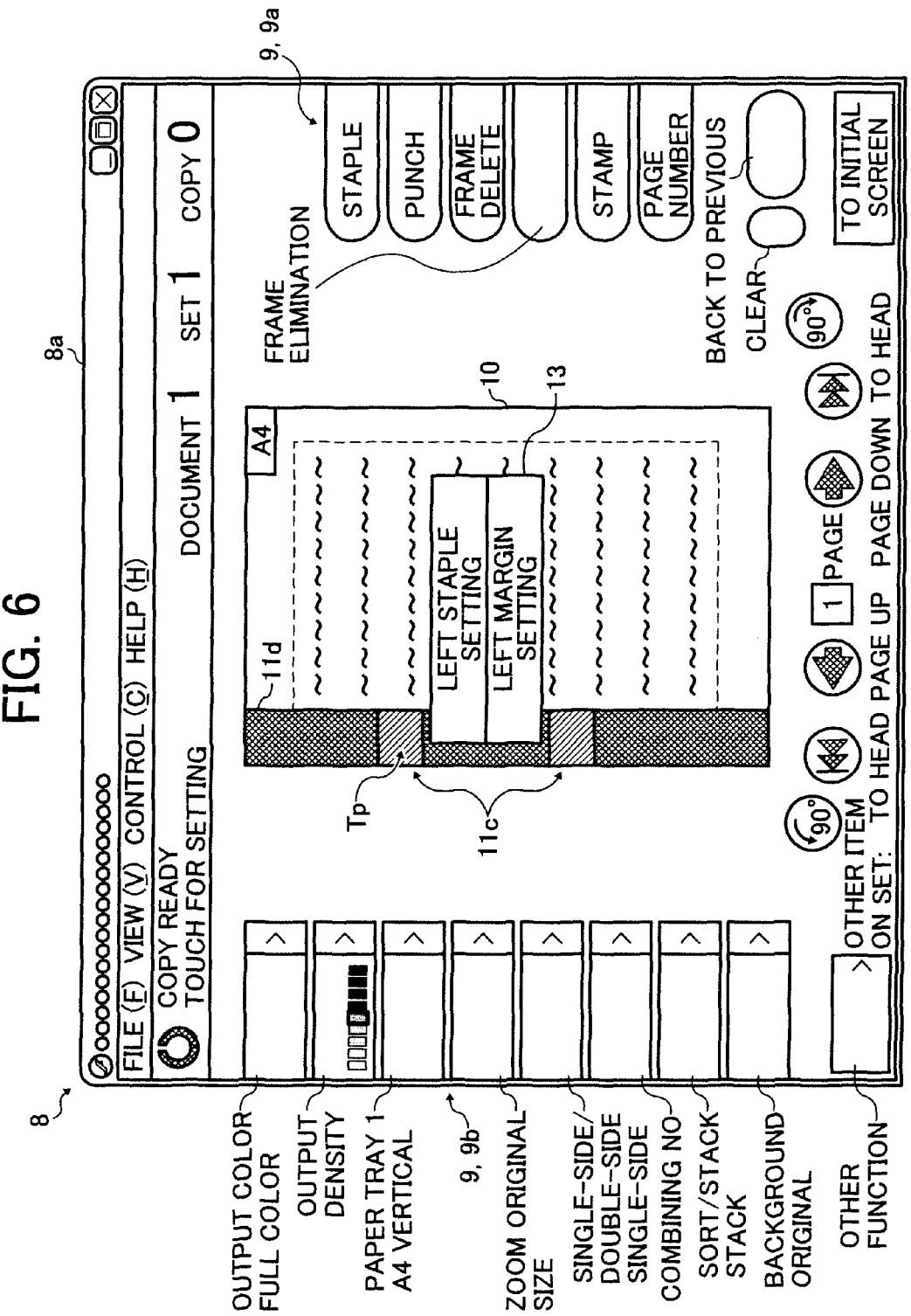
FIG. 6 is one example of a display on the display screen of the preview display unit.

Referring to FIG. 6, the case, for example, that the far left area of the preview 10 includes two areas: a setting area 11c for left staple setting, and a setting area 11d for left margin setting, will be examined. On the setting area table of the internal memory of the menu managing unit 7, as shown in FIG. 7, left staple setting change and left margin setting are set in the setting area name column. For upper-left coordinates and lower-right coordinates indicative of areas, (0, 175), (40, 215), (0,400), and (40, 440) are set in the left staple setting area 11c and (0,0) and (45, 700) are setin the left margin setting area 11d. For corresponding setting items that can be set, left staple setting is set in the left staple setting area and left margin setting is set in the left margin setting area. On the setting area table of FIG. 7, 1 is set for the left staple setting area and 2 is set for the left margin setting area as priority order.

Figure 8:
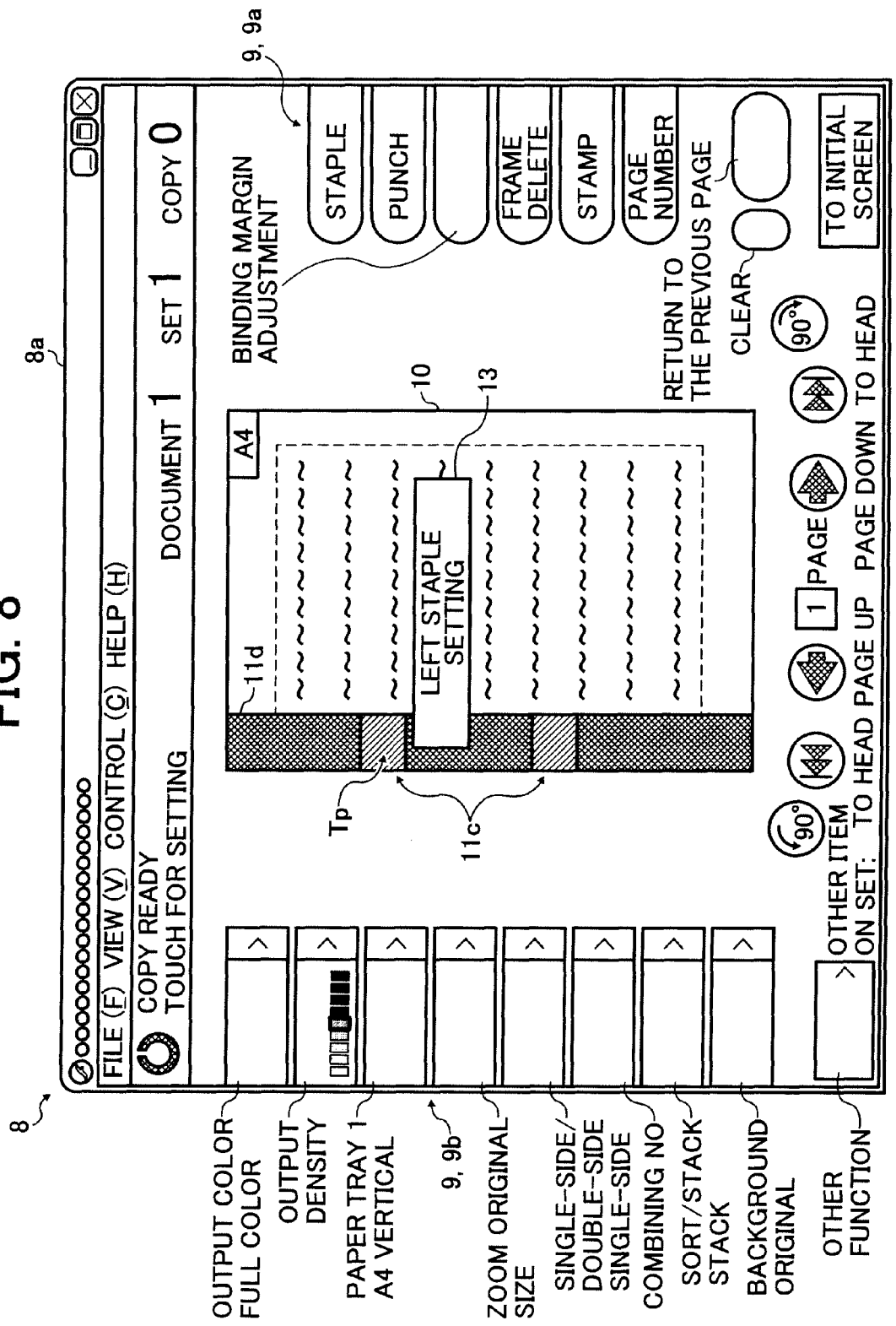
FIG. 8 is one example of a display on the display screen of the preview display unit.

In the preview 10 displayed on the display screen 8a of the preview display unit 8, two small areas on the far left of the preview 10 are now set for the setting area 11c for left staple setting as shown with different hatchings in FIG. 6. An area of the side in the vertical direction on the far left of the preview 10 is set for the setting area 11d for left margin setting. The case that the touch position Tp is specified by a user (by touch operation) in this state will be examined referring to FIG. 6. Although both of the setting area 11c for left staple setting and the setting area 11d for left margin setting include the touch positions Tp, based on the priority set in the setting area table of FIG. 7, priority order of the setting area 11c for left staple setting is higher. Therefore, the menu managing unit 7 prioritizes the setting area 11c for left staple setting and displays the left staple setting as a setting item of the setting area 11c higher in priority than the left margin setting as a setting item of the setting area 11d for left margin setting. For example, as shown in FIG. 6, when displaying the setting items 13 in a row in the vertical direction, the menu managing unit 7 displays by arranging "left staple setting" item on the upper side and "left margin setting" item on the lower side. When only displaying the setting item 13 of setting area with highest in priority order, the menu managing unit 7 only displays "left staple setting" item, as shown in FIG. 8.

In this way, screen display of the setting items can be simple and good in visibility, and operability can further be improved.

The priority order can be determined by size of the areas of the setting areas. In the case of FIG. 6, although the setting area 11c for left staple setting and the setting area lid for left margin setting both include the menu managing unit 7, the size of the setting area 11c for left staple setting is smaller than that of the setting area 11d for left margin setting. If the setting is such that the smaller the area of the setting area the higher the priority order, the menu managing unit 7 determines that the priority of the setting area 11c for left staple setting is higher, and displays the left staple setting as a setting item of the setting area 11c higher in priority than the left margin setting as a setting item of the setting area 11*d*. For example, as shown in FIG. 6, when displaying the setting items 13 in a row in the vertical direction, the menu managing unit 7 displays by arranging "left staple setting" item on the upper side and "left margin setting" item on the lower side. When only displaying the setting item with the smallest setting area, the menu managing unit 7 only displays "left staple setting" item as shown in FIG. 8.

In this manner, a setting area small in area can be appropriately specified and a user can appropriately select desired setting, and operability can further be improved.

Setting areas with visible information can be prioritized in displaying setting items when a specified position is located in a plurality of setting areas.

Figure 9:
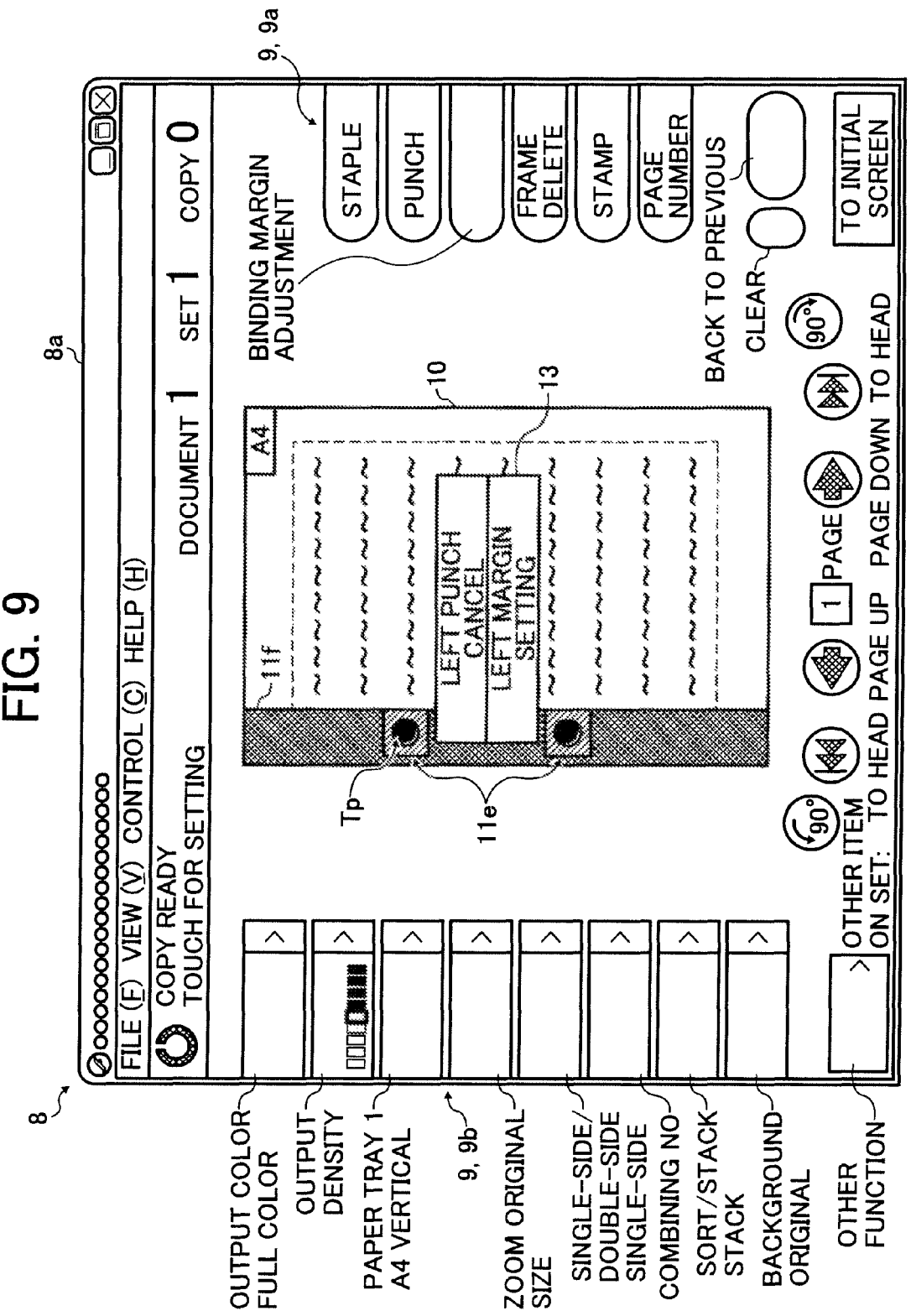
FIG. 9 is one example of a display on the display screen of the preview display unit.

An example of a case that two setting areas, a setting area 11*e* for left punch setting change and a setting area 11*f* for left margin setting, are set in the far left area of the preview will be examined, as shown in FIG. 9. In the setting area table of the internal memory of the menu managing unit 7, left punch setting change and left margin setting are set in the setting area name column, and for upper-left and lower-right coordinates indicative of-areas, (10, 175), (35, 215), (10, 400), and (35, 440) are set in the left punch setting changing area and (0, 0) and (45, 700) are set in the left margin setting area, as shown in FIG. 10. For corresponding setting items that can be set, left punch cancel is set in the left punch setting change area and left margin setting is set in the left margin setting area.

Figure 11:
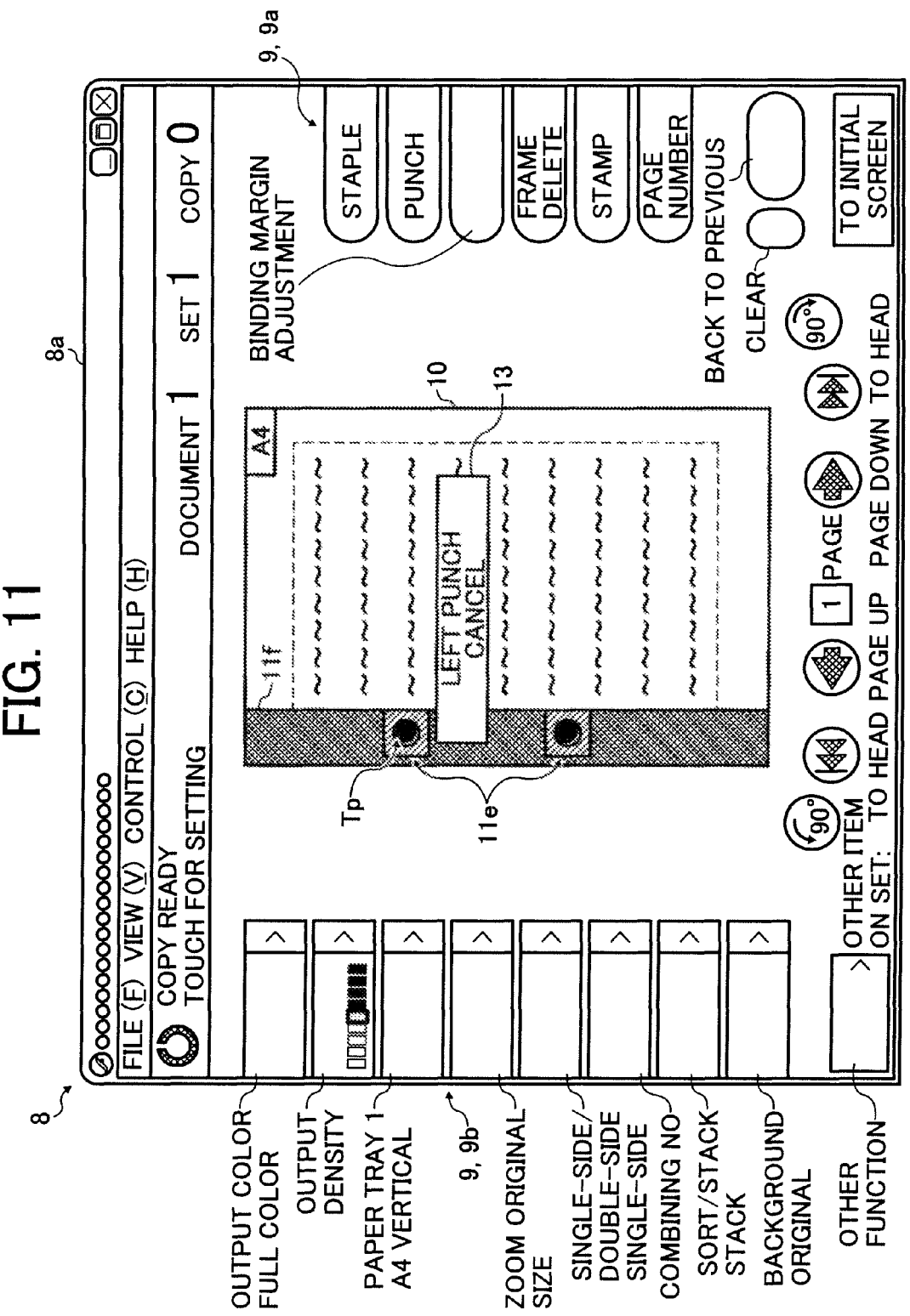
FIG. 11 is one example of a display on the display screen of the preview display unit.

In the preview 10 displayed on the display screen 8a of the preview display unit 8, two small areas on the far left of the preview 10 are set for the setting area lie for left punch setting change as shown with different hatchings in FIG. 9, and black circle visible information indicative of punch holes are displayed. The setting area 11*f* for left margin setting is set at the side in the vertical direction on the far left of the preview 10. Referring to FIG. 9, the case that the touch position Tp is specified by a user (by touch operation) in this state will be examined. Both of the setting area 11*e* for left punch setting change and the setting area 11*f* for left margin setting include the touch position Tp. In the setting area 11*e* for punch setting change, round circle visible information indicating a punch hole is displayed, and the rule is such that the setting area having the visible information is prioritized. Therefore, the menu managing unit 7 prioritizes the setting area 11*e* for left punch setting change and displays the left punch cancel as a setting item of the setting area 11*e* higher in priority than the left margin setting as a setting item of the setting area 11*f*. For example, as shown in FIG. 9, when displaying the setting items 13 in a row in the vertical direction, the menu managing unit 7 displays by arranging "left punch cancel" item on the upper side and "left margin setting" item on the lower side. When displaying only the setting items 13 of the setting areas having visible information, the menu managing unit 7 displays only "left punch cancel" item as shown in FIG. 11.

With a user specifying an area of visible information, the menu managing unit 7 determines that the user strongly intends to specify the setting area having the visible information. As a result, the menu managing unit 7 can display setting items in compliance with the user's intention, and the operability can be further improved.

According to the embodiment, when a setting item setting operation is performed, the preview generating unit 6 re-creates a preview based on the setting contents and displays the image on the preview display unit 8.

Therefore, a user can perform setting operation while checking a result of settings with a preview. That is, setting operation that achieves results desired by the user can be properly and easily performed.

Figure 12:
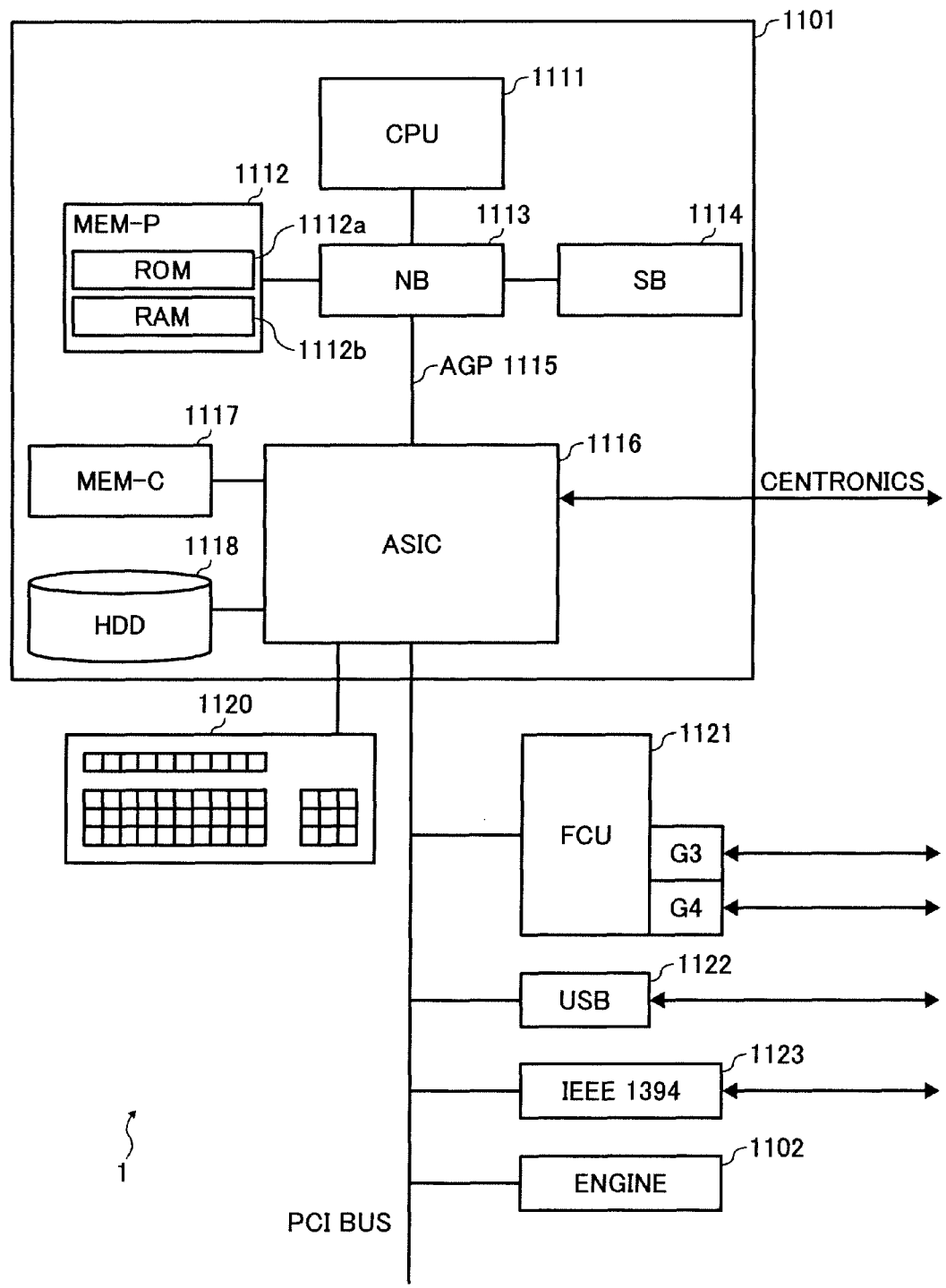
FIG. 12 is a block diagram of a hardware configuration of the image processing apparatus.

FIG. 12 is a block diagram of a hardware configuration of the image processing apparatus 1 according to the embodiment. The image processing apparatus 1 is configured as an MFP providing multi-functions of, for example, a facsimile machine and a scanner. As shown in FIG. 12, the image processing apparatus 1 includes a controller 1101 and an engine 1102 connected by a Peripheral Component Interconnect (PCI) bus. The controller 1101 controls the entire image processing apparatus 1 and controls drawing, communication, and input from an operating unit 1120. The engine 1102 is a printer engine, etc., that is connectable to the PCI bus. The engine 1102 is a monochrome plotter, a 1-drum color plotter, a 4-drum color plotter, a scanner, or a fax unit, for example. The engine 1102 includes image processing parts such as an error diffusion and a gamma conversion in addition to engine parts such as a plotter.

The controller 1101 includes a CPU 1111, a system memory (MEM-P) 1112, a north bridge (NB) 1113, a south bridge (SB) 1114, an Application Specific Integrated Circuit (ASIC) 1116, a local memory (MEM-C) 1117, and a HDD 1118. An Accelerated Graphics Port (AGP) bus 1115 connects the NB 1113 and the ASIC 1116. The MEM-P 1112 further includes a ROM 1112*a* and a RAM 1112*b*.

The CPU 1111 controls the entire image processing apparatus 1 and includes a chip set consisted of the MEM-P 1112 and the SB 1114. The CPU 1111 is connected to other devices through the chip set.

The NB 1113 is a bridge that connects the MEM-P 1112, the SB 1114, and the AGP bus 1115 to the CPU 1111 and includes a memory controller that controls reading, writing, etc., to and from the MEM-P 1112, a PCI master, and an AGP target.

The MEM-P 1112 is a system memory used as a memory for storing programs and data, a memory for loading programs and data, a memory of a printer for drawing, etc., and includes the ROM 1112*a* and the RAM 1112*b*. The ROM 1112*a* stores programs and data to control the CPU 1111. The RAM 1112*b* is a readable and writable memory used as a memory for expanding programs and data and a memory of a printer for drawing.

The SB 1114 is a bridge that connects a PCI device and a peripheral-device to the NB 1113. The SB 1114 is connected to the NB 1113 through a PCI bus, and a network interface (I/F), etc., is connected to the PCI bus.

The ASIC 1116 is an Integrated Circuit (IC) for image processing applications having hardware elements of image processing and serves as a bridge that connects each of the AGP bus 1115, the PCI bus, the HDD 1118, and the MEM-C 1117. The ASIC 1116 includes a PCI target and AGP master, an arbiter (ARB) that is a core of the ASIC 1116, a memory controller that controls the MEM-C 1117, a plurality of Direct Memory Access Controllers (DMACs) that conducts rotation, etc., of image data by hardware logic, etc., a PCI unit that transmits data to the engine 1102 through the PCI bus. A Fax Control Unit (FCU) 1121, a Universal Serial Bus (USB) 1122, and an Institute of Electrical and Electronics Engineers (IEEE) 1394 interface 1123 are connected to the ASIC 1116 through the PCI bus.

The MEM-C 1117 is a local memory used as an image buffer for copying and a code buffer, and the HDD 1118 is a storage that stores image data, a program that controls operations of the CPU 1111, font data, and a form.

The AGP bus 1115 is a bus interface for graphics accelerator card that is proposed to speed up the graphics processing. The AGP bus 1115 speeds up the graphics accelerator card by directly accessing the MEM-P 1112 by high throughput.

The operating unit 1120 (input detecting unit 2) that connects to the ASIC 1116 accepts operation input from an operator and transmits the accepted operation input information to the ASIC 1116.

Incidentally, an image displaying program and an image forming program executed by the image processing apparatus 1 of the embodiment can be previously stored in the ROM, etc.

The image displaying program and the image forming program can be stored in a computer-readable recording medium such as a Compact Disc-Read Only Memory (CD-ROM), a flexible disk (FD), a Compact Disc-Recordable (CD-R), a Digital Versatile Disk (DVD), etc., in an installable format file or an executable format file.

The image displaying program and the image forming program can also be stored in a computer connected to a network such as the Internet and downloaded through the network. The image displaying program and the image forming program can also be provided or distributed through a network such as the Internet.

The image processing apparatus 1 of the embodiment has a module configuration including the units described above (input detecting unit 2, controlling unit 3, setting unit 4, setting-information storing unit 5, preview generating unit 6, menu managing unit 7, preview display unit 8, etc.). The CPU (processor) loads the image displaying program and the image forming program from the ROM into the main storage-device, and executes the programs. Thus, the input detecting unit 2, the controlling unit 3, the setting unit 4, the setting-information storing unit 5, the preview generating unit 6, the menu managing unit 7, preview display unit 8, etc., are implemented in the main storage device.

Figure 13:
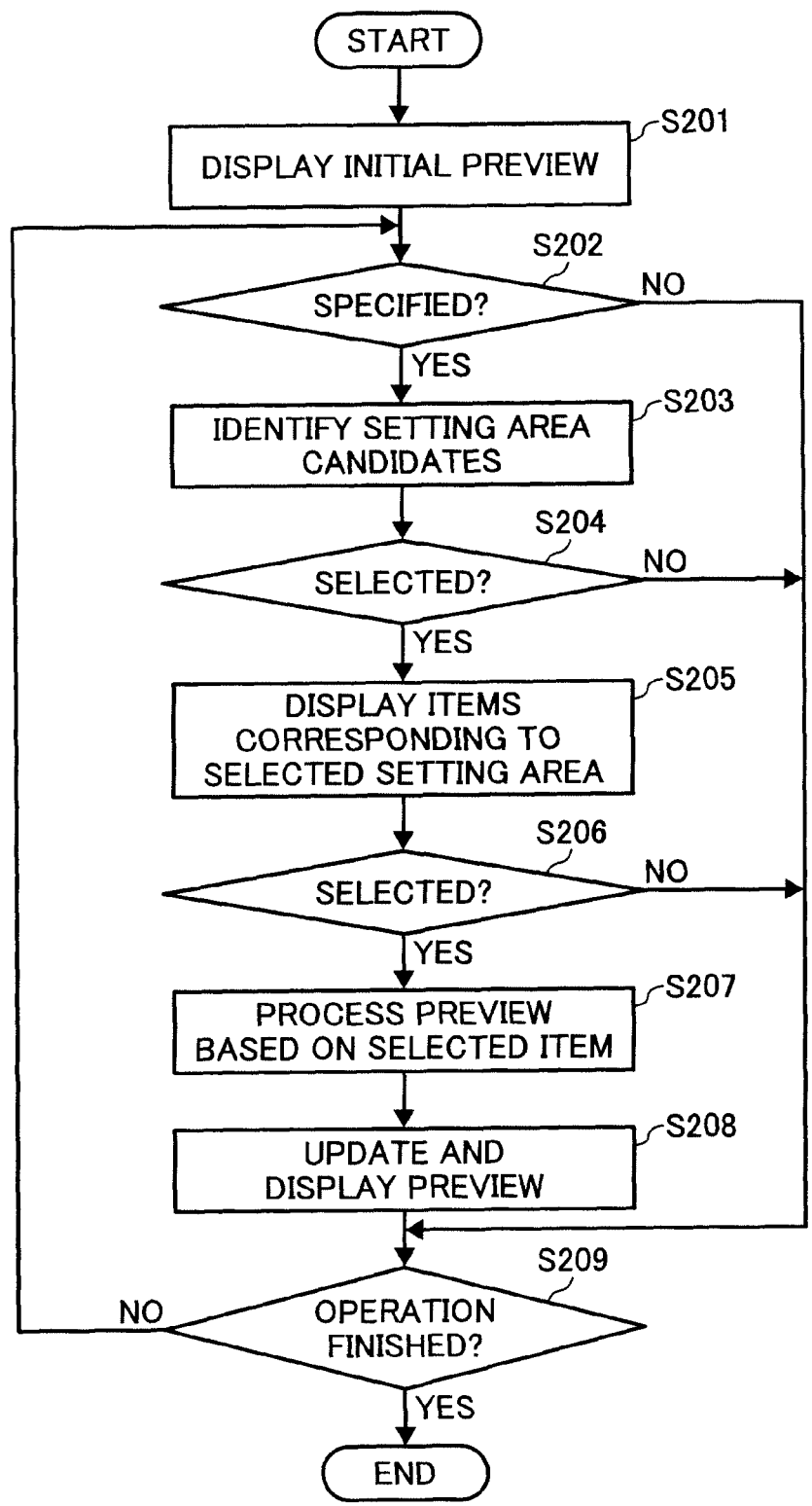
FIG. 13 is a flowchart of a setting process on an image performed by an image processing apparatus according to a second embodiment of the present invention.

FIG. 13 is a flowchart of a setting process on an image performed by an image processing apparatus according to a second embodiment of the present invention.

The image processing apparatus of the second embodiment is in many respects basically similar to that of the first embodiment, and the same reference numerals are utilized in designating corresponding portions thereof.

When an arbitrary position of a preview is specified and the position is located in a plurality of setting areas, the image processing apparatus 1 of the embodiment displays names of the setting areas on the display screen with setting items that correspond to only one or more setting areas selected from all the setting areas.

Such a setting process on an image by the image processing apparatus 1 will be explained referring to FIG. 13. When the image processing apparatus 1 receives an image to be processed from the image input unit and stores the image in the image memory, the preview generating unit 6 creates a preview of the image based on the default setting (initial setting) information. The preview generating unit 6 then displays the preview 10 on the display screen 8a of the preview display unit 8 as shown in FIG. 2 (step S201).

After displaying the preview 10, the image processing apparatus 1 checks whether an arbitrary position on the display screen 8a is specified through the touch panel of the input detecting unit 2 (step S202).

When no position is specified (No at step S202), the process proceeds to step S209, and a determination is made as to whether the operation is finished (step S209). When the operation is not finished (No at step S209), the process returns to step S202.

When a position is specified (Yes at step S202), the image processing apparatus 1 identifies setting areas corresponding to the position referring to the setting information in the internal memory, and displays the setting areas on the display screen 8a as setting area candidates (step S203).

Figure 14:
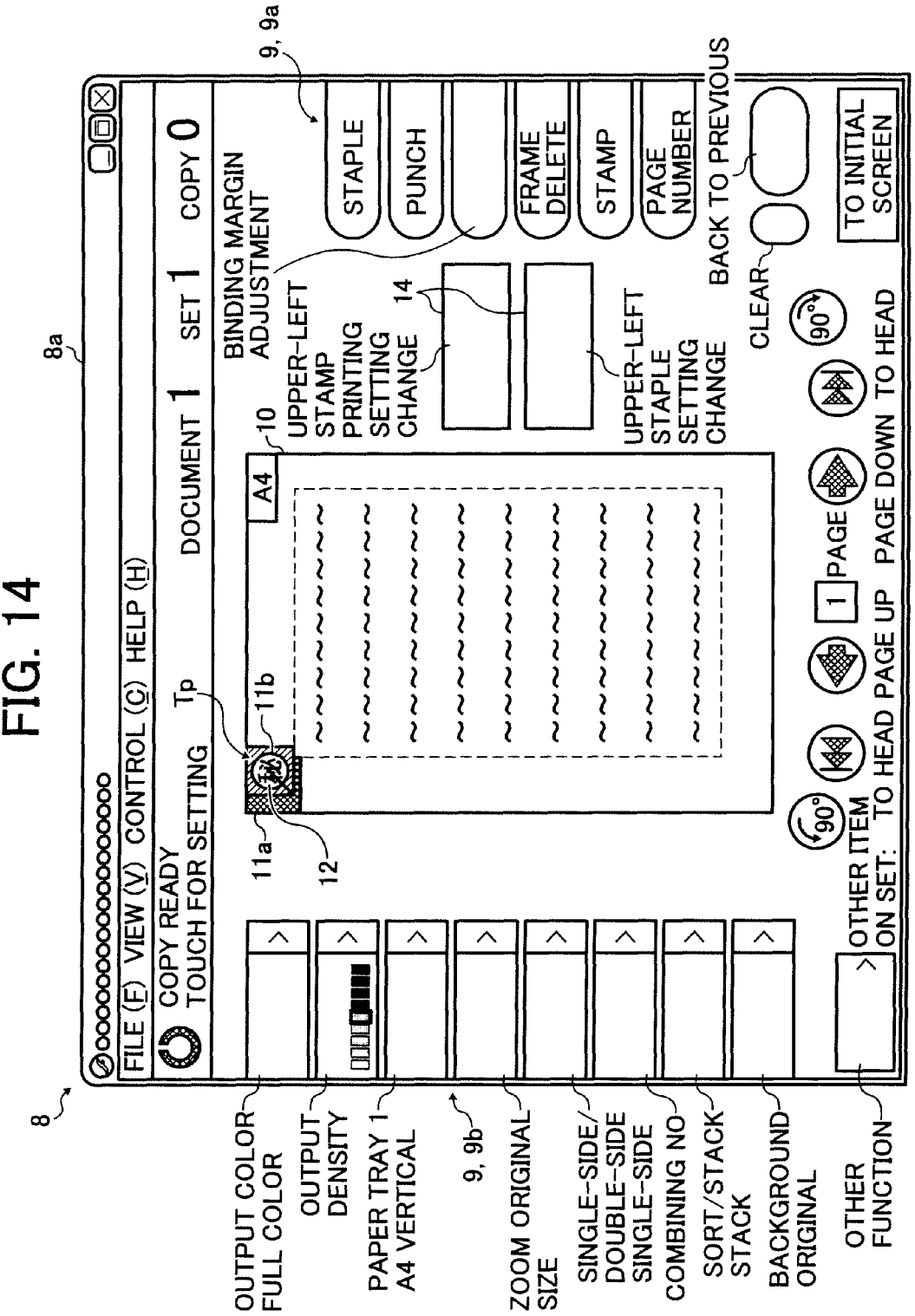
FIG. 14 is one example of a display on the display screen of the preview display unit.

FIG. 14 is one example of the display screen 8a of the preview display unit 8 that displays setting items when the upper-left corner of the preview 10 is specified as a touch position Tp in the setting process. As shown in FIG. 14, the position on the upper-left corner of the preview 10 includes two setting-areas: the setting area 11a for upper-left staple setting change, and the setting area 11b for upper-left stamp printing setting change. In this case, all setting area candidates 14 corresponding to a specified position are displayed on the right side of the preview 10, for example. The setting area candidates 14 indicates the name (upper-left staple setting change) of the setting area 11a for upper-left staple setting change and the name (upper-left stamp printing setting change) of the setting area 11b for upper-left printing setting change.

After displaying the setting area candidates 14 (step S203), the image processing apparatus 1 checks whether a desired setting area is selected from the setting area candidates 14 through the input detecting unit 2.

When no area is selected (No at step S204), the process proceeds to step S209, and a determination is made as to whether the operation is finished as described above (step S209). When the operation is not finished (No at step S209), the process returns to step S202, and the process from step S202 to S204 is performed.

When a desired setting area is selected from the setting area candidates 14 (Yes at step S204), the image processing apparatus 1 displays the setting items 13 stored in association with the selected setting area on the display screen 8a of the preview display unit 8 that displays the preview 10 (step S205), and checks whether a setting item is selected (step S206).

Figure 15:
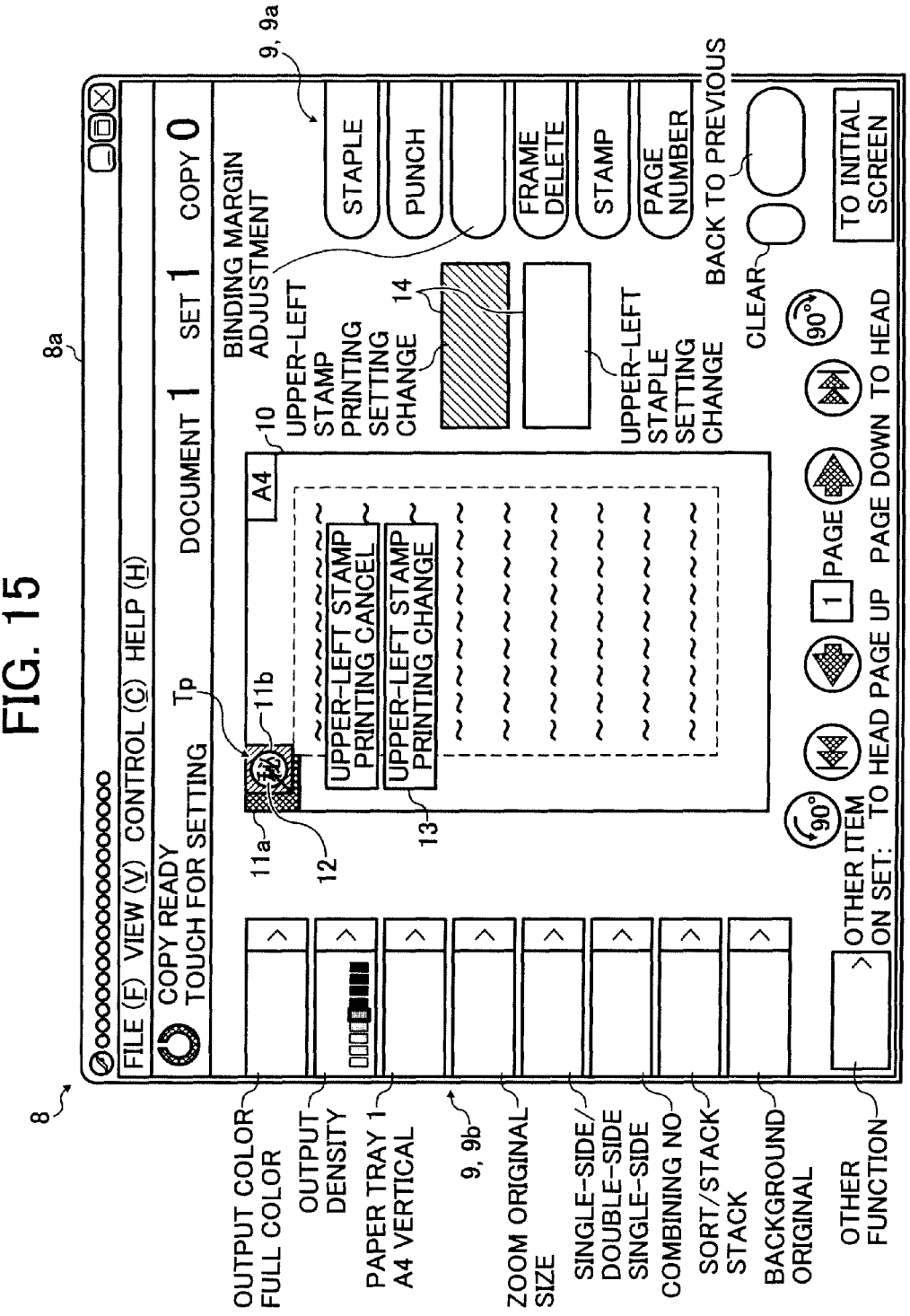
FIG. 15 is one example of a display on the display screen of the preview display unit.

As shown in FIG. 15, when a desired setting area name ("upper-left stamp printing setting change" in FIG. 15) is selected from the setting area candidates 14, the setting item 13 associated with the selected setting area is displayed.

When no item is selected (No at step S206), the process proceeds to step S209, and a determination is made as to whether the setting operation is finished as described above. When the setting operation is not finished (No at step S209), the process returns to step S202, and the process form step S202 to S206 is performed.

When a setting item is selected (Yes at step S205), the controlling unit 3 sends the setting contents of the selected setting item 13 to the setting unit 4. The setting unit 4 generates setting information necessary to process based on the setting contents, and outputs the information to the setting-information storing unit 5. The preview generating unit 6 generates a preview based on the setting information from the setting-information storing unit 5 (step S207), and displays the image on the display screen 8a of the preview display unit 8 (step S208).

Having displayed the preview after setting change, the image processing apparatus 1 checks whether the setting operation is finished (step S209). When the setting operation is not finished (No at step S209), the process returns to step S202, and the process from step S202 to S209 is performed.

When the setting operation is finished (Yes at step S209), the image processing apparatus 1 ends the setting process.

Figure 16:
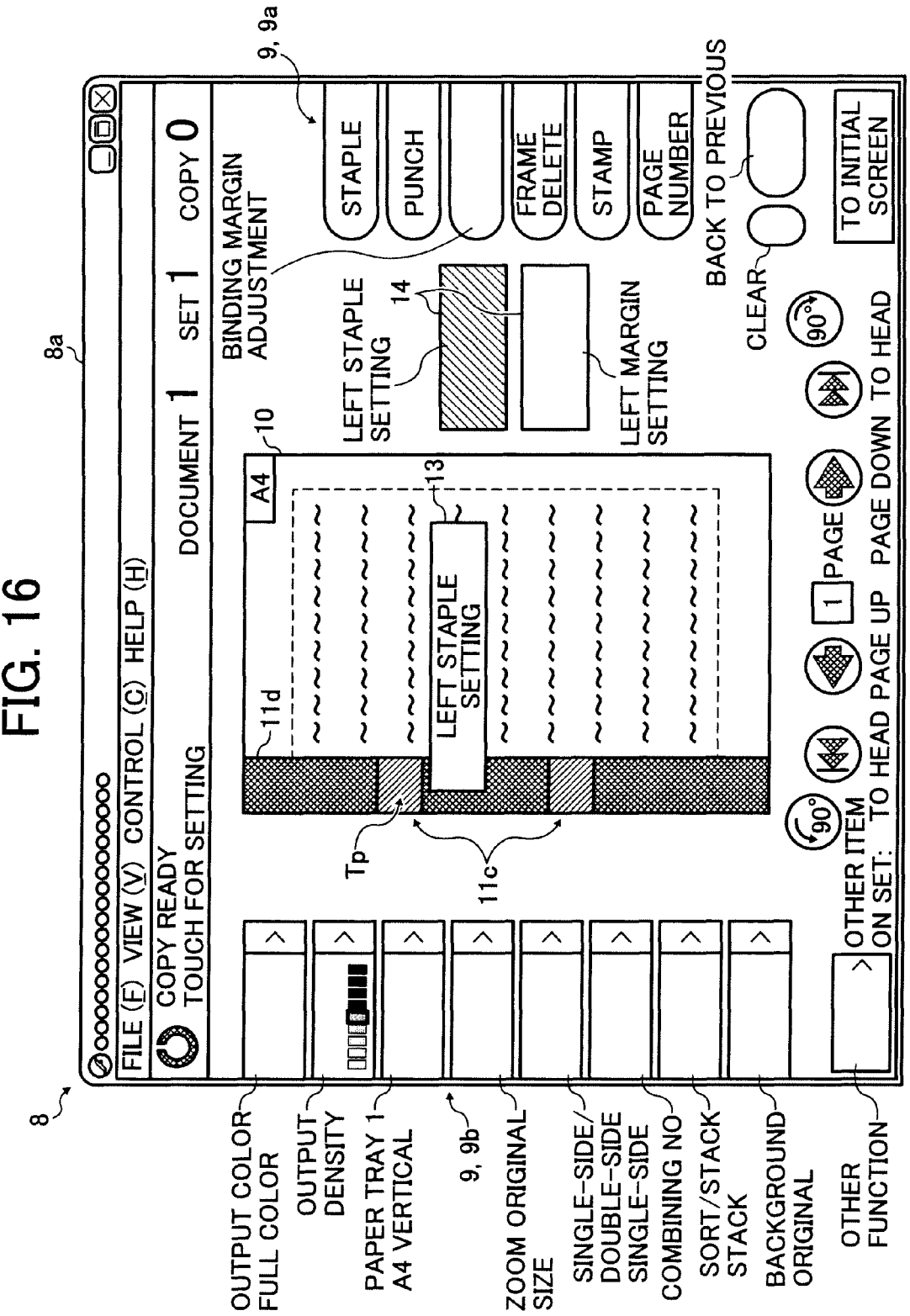
FIG. 16 is one example of a display on the display screen of the preview display unit.

FIG. 16 is an example of a display in the case where the far left area of the preview 10 includes two setting areas: the setting area 11c for left staple setting, and the setting area 11d for left margin setting. As shown in FIG. 16, all the setting area candidates 14 including the specified position of the display screen 8a of the preview display unit 8 that displays the preview 10 are displayed on the right side of the preview 10, for example. The setting area candidates 14 are the setting area name (left staple setting) of the setting area 11c for left staple setting and the setting area name (left margin setting) of the setting area 11d for left margin setting. As shown in FIG. 16, after a desired setting area name (in FIG. 16, "left staple setting") is selected from the setting area candidates 14, setting items 13 of the selected setting area is displayed.

In this manner, the image processing apparatus 1 of the embodiment displays setting items of a setting area that a user selected from the multiple setting areas that include specified positions in the areas.

Therefore, setting operation further complies with user requests, and the operability can be improved.

A third embodiment of the present invention will then be described.

Although, in the first and second embodiments, an MFP is applied as a user interface apparatus and as an image processing apparatus (the image processing apparatus 1) of the present invention, other devices can also be applied. For example, similar operational effects as the various operational effects described above can be obtained by connecting an image forming apparatus such as a printer to a personal computer (PC) while installing a predetermined program to a storage device such as an HDD of the PC and activating a CPU of the PC according to the program.

Figure 17:
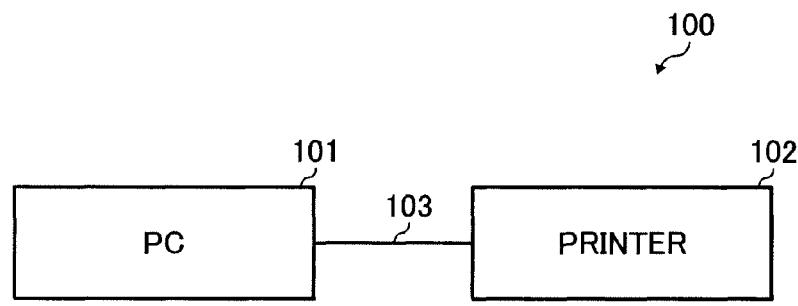
FIG. 17 is a schematic block diagram of a printing system according to a third embodiment of the present invention.

FIG. 17 is a block diagram of a printing system 100 according to the third embodiment of the present invention. The printing system 100 includes a PC 101 that sends out print data and print jobs including print conditions for printing the print data and a printer 102 that prints the print data connected through a cable 103.

The PC 101 sends out, as print jobs, print data corresponding to created documents and print condition data (paper direction, double-side, combining, binding, staple, punch, zoom up/down, etc.) that is set to print the documents.

The printer 102 prints the print data according to the print jobs that are sent from the PC 101. Specifically, the printer 102 prints, to media such as paper, the print data included in the print jobs according to the print conditions (paper direction, double-side, intensive, binding, staple, punch, zoom up/down, etc.) included in the print jobs.

Specific configurations of the PC 101 and the printer 102 will be described in sequence.

Figure 18:
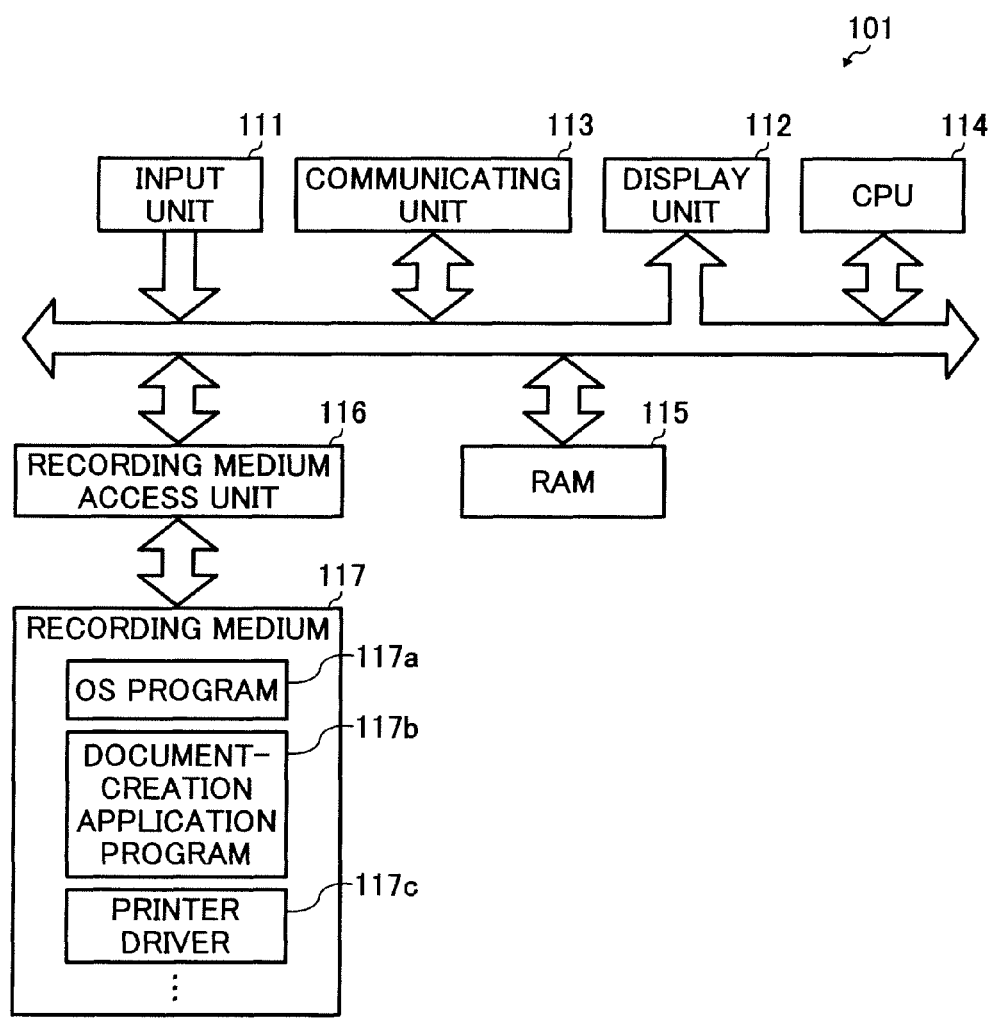
FIG. 18 is a schematic block diagram of a personal computer.

FIG. 18 is a schematic block diagram of the PC 101. The PC 101 includes an input unit 111 that inputs data, a display unit 112, a communicating unit 113, a CPU 114 that controls the entire apparatus, a RAM 115 that is used as a work area of the CPU 114, a recording medium access unit 116 that reads and writes data of a recording medium 117, and the recording medium 117 that stores various programs, etc., to operate the CPU 114.

The input unit 111 includes a keyboard having cursor keys, number input keys, various function keys, etc., a mouse or a slice pad, etc., that conducts selection of the keys, etc., on the display screen of the display unit 112. The input unit 111 is a user interface that an operator gives operation instructions to the CPU 114 and that inputs data.

The display unit 112 includes a Cathode Ray Tube (CRT), an LCD, etc., and displays display data input from the CPU 114. The communicating unit 113 is a unit that conducts data communications with the outside and, for example, conducts data communications with the-printer 102 through the cable 103.

The CPU 114 is a central control unit that controls the entire apparatus according to programs stored in the recording medium 117. The input unit 111, the display unit 112, the communicating unit 113, the RAM 115, and the recording medium access unit 116 are connected to the CPU 114, and the CPU 114 controls data communications, reading of application programs by accessing the memory or reading/writing of various data, data/command input, displaying, etc. The CPU 114 also sends out, as print jobs, print data input from the input unit 111 and print condition data of the print data to the printer 102 through the communicating unit 113.

The RAM 115 serves as a work memory that stores specified programs, input instructions, input data, processing results, etc., and a display memory that temporarily stores display data to display the data on the display screen of the display unit 112.

The recording medium 117 stores various programs and data such as an OS program 117a executable by the CPU 114 (for example, WINDOWS (registered trademark)), a document-creation application program 117b, and a printer driver 117c corresponding to the printer 102. Examples of the recording medium 117 are optical, magnetic, and electric recording media such as a flexible disk, a hard disk, a CD-ROM, a DVD-ROM, and a Magneto Optical disk (MO) or PC card. The various programs are stored in the recording medium 117 in a data form readable by the CPU 114. In some cases, the various programs are recorded in the recording media in advance, and in other cases, the various programs are stored in the recording media downloaded through communication lines. The various programs are distributable through communication lines.

Figure 19:
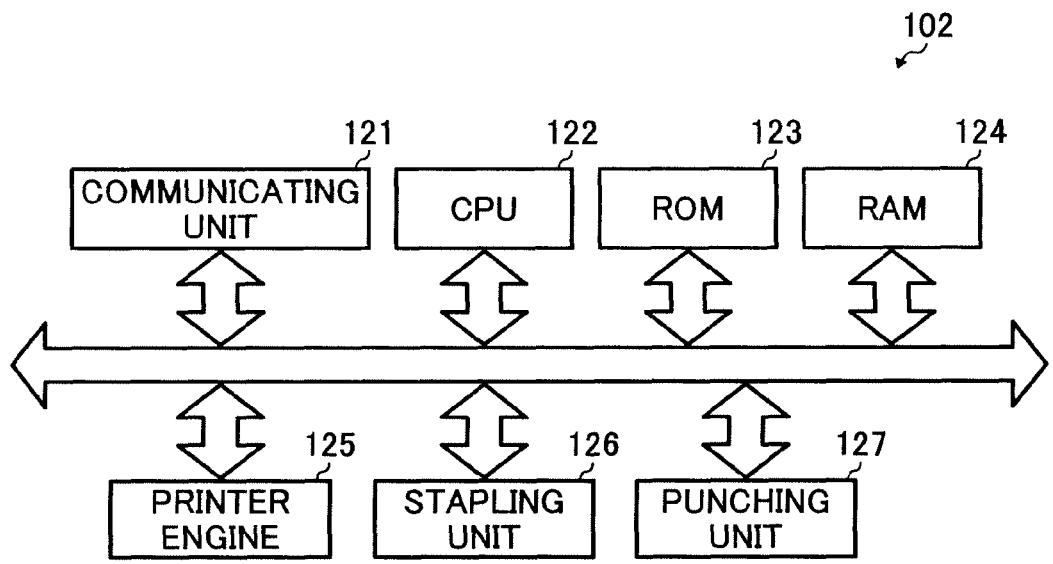
FIG. 19 is a block diagram of a printer.

FIG. 19 is a schematic block diagram of the printer 102. The printer 102 includes a communicating unit 121 that conducts data communication, a CPU 122 that controls the entire printer 102, a ROM 123 that stores various control programs to operate the CPU 122, a RAM 124 that temporarily stores print data and print condition data of print jobs input from work areas of various programs, the PC 101, etc., a printer engine 125 that prints the print data to transfer papers, a stapling unit 126 that staples papers printed with the print data, a punching unit 127 that punches holes to the transfer papers printed with the print data. In short, the printer 102 provides a double-side function, a punch function, a staple function, etc.

The communicating unit 121 is a unit that conducts data communication with the outside. For example, the communicating unit 121 conducts data communication with the PC 101.

The CPU 122 is a central control unit that controls the entire apparatus according to various control programs stored in the ROM 123. The communicating unit 121, the ROM 123, the RAM 124, the printer engine 125, the stapling unit 126, and the punching unit 127 are connected to the CPU 122, and the CPU 122 controls data communications, printer operations, etc.

The ROM 123 stores various control programs, parameters used for the operation, etc. The RAM 124 provides a work memory that stores specified control programs, processing results, received print data, etc.

The printer engine 125 is an electrophotographic printer engine and is a unit that prints the print data to the transfer papers. The printer 102 can adopt various printing methods other than the electrophotographic method, such as an ink jet method, a sublimation thermal transfer method, a silver halide photographic method, a direct thermal recording method, and a thermofusible transfer method.

The printer driver 117c of the PC 101 will then be described. The printer driver 117c is a software program designed to operate programs against specific programs without troubles from the hardware of the printer 102 or internal language. The printer driver 117c controls the printer 102 and conducts output data process, etc.

The CPU 114 of the PC 101, according to the printer driver 117c, generates and displays the preview based on print data input from the input unit 111 and print condition data of the print data and transmits print data created with the document-creation application program 117b to the printer 102.

Figure 20:
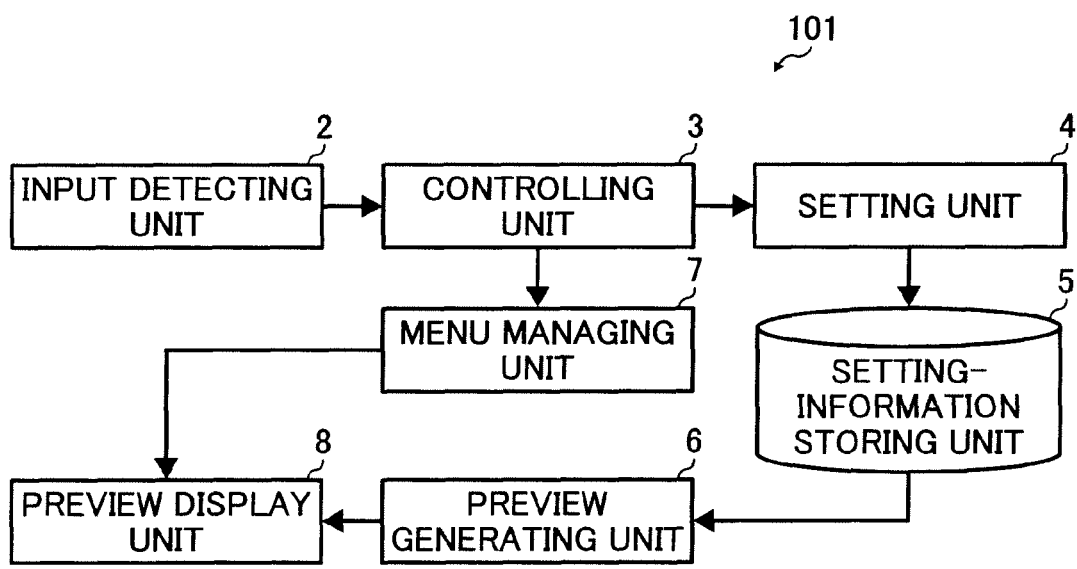
FIG. 20 is a block diagram of a main part of the personal computer shown in FIG. 18.

By the CPU 114 operating according to the printer driver 117c, as shown in FIG. 20, the PC 101 implements then input detecting unit 2, the controlling unit 3, the setting unit 4, the setting-information storing unit 5, the preview generating unit 6, the menu managing unit 7, and the preview display unit 8 of the image processing apparatus 1. The input unit 111 is employed for the input detecting unit (area specifying unit) 2.

Because the operation of the CPU 114 according to the printer driver 117c causes the PC 101 to implement an equivalent system configuration as the image processing apparatus 1 of FIG. 1, operation effects similar to the various operation effects described in the first and second embodiments can be obtained.

Figure 21:
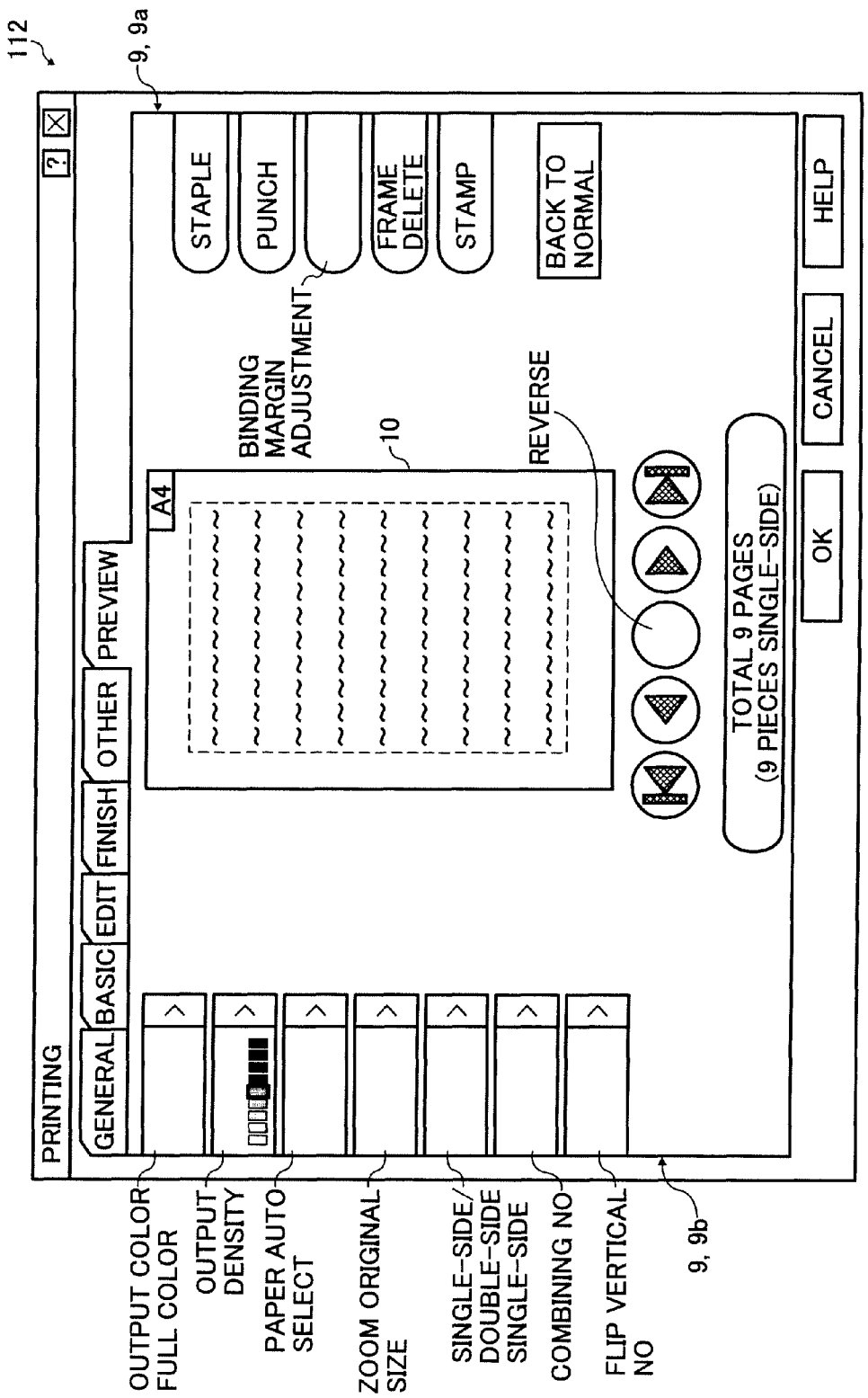
FIG. 21 is one example of a display screen displayed by a printer driver shown in FIG. 18.

FIG. 21 is one example of a display screen displayed by the printer driver 117c. The screen of FIG. 21 is a display screen of the document-creation application program 117b or a start-up screen of the OS program 117a, etc., and is a screen displayed when activation of the printer driver 117c is selected. In the screen of the FIG. 21, in addition to a basic conditions setting screen, an edit condition setting screen, a finish conditions setting screen, etc., a preview setting screen (similar to the display screen 8a of the preview display unit 8 of the image processing apparatus 1) that generates and displays the preview based on the print data input from the input unit 111 and the print conditions data of the print data is selectable.

In the embodiment, although the preview setting screen that generates and displays the preview based on the print data input from the input unit 111 and the print conditions data of the print data is displayed by operating the CPU 114 of the PC 101 according to the printer driver 117c, it is not limited to this, and the preview setting screen can be displayed by operating the CPU 114 of the PC 101 according to the document-creation application program 117b or the OS program 117a.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A user interface apparatus comprising:
an area detecting unit that detects a selected position on a to-be-processed image displayed on a display screen;
a menu display unit that displays on the display screen, in response to the detection of the selected position on the to-be-processed image, a link to at least one setting item being displayed in response to the selected position on the to-be-processed image, the at least one setting item corresponding to a setting available for a setting area which corresponds to the selected position on the to-be-processed image, wherein an order of display priority of the at least one setting item is determined by a size of the setting area;
a determining unit that determines that the setting item is specified;
an accepting unit that accepts the setting corresponding to the setting item for the to-be-processed image; and
a preview display unit that displays on the display screen a preview indicating a result of processing the to-be-processed image based on the setting item.

2. The user interface apparatus according to claim 1, wherein the menu display unit displays, when the selected position overlaps a plurality of setting areas, setting items associated with all the setting areas for the to-be-processed image.

3. The user interface apparatus according to claim 1, wherein the menu display unit displays, when the selected position overlaps a plurality of setting areas, setting items associated with all the setting areas for the to-be-processed image in descending order of display priority of the setting areas.

4. The user interface apparatus according to claim 1, wherein the menu display unit displays, when the selected position overlaps a plurality of setting areas, at least one setting item with highest display priority among setting items associated with the setting areas for the to-be-processed image.

5. The user interface apparatus according to claim 1, wherein the menu display unit displays, when the selected position overlaps a plurality of setting areas, setting items associated with all the setting areas for the to-be-processed image in ascending order of size of the setting areas.

6. The user interface apparatus according to claim 1, wherein the menu display unit displays, when the selected position overlaps a plurality of setting areas, at least one setting item associated with only a setting area that includes visible information.

7. The user interface apparatus according to claim 1, wherein the menu display unit indicates, when the selected position overlaps a plurality of setting areas, the setting areas in a selectable manner, and displays at least one setting item associated with only selected setting area.

8. An image processing apparatus comprising:
a storing unit that previously stores in a storage unit at least one setting area for a display area of a display screen in association with at least one setting item for a to-be-processed image displayed on the display screen;
an area detecting unit that detects a selected position on the to-be-processed image;
a menu display unit that displays on the display screen, in response to the detection of the selected position on the to-be-processed image, the setting item in the storage unit, a link to the setting item being displayed in response to the selected position on the to-be-processed image, the at least one setting item corresponding to a setting available for the setting area which corresponds to the selected position on the to-be-processed image, wherein an order of display priority of the setting item is determined by a size of the setting area;
a determining unit that determines that the setting item is specified;
an accepting unit that accepts the setting corresponding to the setting item for the to-be-processed image;
a preview generating unit that generates a preview indicating a result of processing the to-be-processed image based on the setting item; and
a preview display unit that displays the preview on the display screen.

9. The image processing apparatus according to claim 8, wherein the preview generating unit performs processing for the to-be-processed image based on the setting item, the processing including image processing, recording and outputting of an image after the image processing, and post-processing of paper on which the image is recorded.

10. The image processing apparatus according to claim 8, wherein the menu display unit displays, when the selected position overlaps a plurality of setting areas, setting items associated with all the setting areas for the to-be-processed image.

11. The image processing apparatus according to claim 8, wherein the menu display unit displays, when the selected position overlaps a plurality of setting areas, setting items associated with all the setting areas for the to-be-processed image in descending order of display priority of the setting areas.

12. The image processing apparatus according to claim 8, wherein the menu display unit displays, when the selected position overlaps a plurality of setting areas, at least one setting item with highest display priority among setting items associated with the setting areas for the to-be-processed image.

13. The image processing apparatus according to claim 8, wherein the menu display unit displays, when the selected position overlaps a plurality of setting areas, setting items associated with all the setting areas for the to-be-processed image in ascending order of size of the setting areas.

14. The image processing apparatus according to claim 8, wherein the menu display unit displays, when the selected position overlaps a plurality of setting areas, at least one setting item associated with only a setting area that includes visible information.

15. The image processing apparatus according to claim 8, wherein the menu display unit indicates, when the selected position overlaps a plurality of setting areas, the setting areas in a selectable manner, and displays at least one setting item associated with only selected setting area.

16. A non-transitory computer-readable storage medium including computer executable instructions, wherein the instructions, when executed by a computer, cause the computer to perform a method comprising:
   storing in a storage unit at least one setting area for a display area of a display screen in association with at least one setting item for a to-be-processed image displayed on the display screen;
   detecting a selected position on the to-be-processed image;
   displaying on the display screen, in response to the detection of the selected position on the to-be-processed image, the setting item in the storage unit, a link to the setting item being displayed in response to the selected position on the to-be-processed image, the at least one setting item corresponding to a setting available for the setting area which corresponds to the selected position on the to-be-processed image, wherein an order of display priority of the setting item is determined by a size of the setting area;
   determining that the setting item is specified;
   accepting the setting corresponding to the setting item for the to-be-processed image;
   generating a preview indicating a result of processing the to-be-processed image based on the setting item; and
   displaying the preview on the display screen.

* * * * *